United States Patent
Hirai et al.

(10) Patent No.: US 9,317,754 B2
(45) Date of Patent: Apr. 19, 2016

(54) OBJECT IDENTIFYING APPARATUS, MOVING BODY CONTROL APPARATUS, AND INFORMATION PROVIDING APPARATUS

(75) Inventors: Hideaki Hirai, Kanagawa (JP); Shin Aoki, Kanagawa (JP); Masanori Kobayashi, Kanagawa (JP); Xue Li, Kanagawa (JP); Ryosuke Kasahara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 722 days.

(21) Appl. No.: 13/516,754

(22) PCT Filed: Dec. 15, 2010

(86) PCT No.: PCT/JP2010/073069
§ 371 (c)(1),
(2), (4) Date: Jun. 18, 2012

(87) PCT Pub. No.: WO2011/078199
PCT Pub. Date: Jun. 30, 2011

(65) Prior Publication Data
US 2012/0268602 A1    Oct. 25, 2012

(30) Foreign Application Priority Data

| Dec. 25, 2009 | (JP) | 2009-295885 |
| Dec. 25, 2009 | (JP) | 2009-295902 |
| Dec. 25, 2009 | (JP) | 2009-295963 |
| Oct. 29, 2010 | (JP) | 2010-243925 |
| Oct. 29, 2010 | (JP) | 2010-243951 |
| Oct. 29, 2010 | (JP) | 2010-243989 |

(51) Int. Cl.
*H04N 7/18*  (2006.01)
*G06K 9/00*  (2006.01)
*G06T 7/00*  (2006.01)

(52) U.S. Cl.
CPC ........ *G06K 9/00798* (2013.01); *G06K 9/00805* (2013.01); *G06T 7/0042* (2013.01);
(Continued)

(58) Field of Classification Search
CPC ........... G06K 9/00798; G06K 9/00805; G06T 7/0042; G06T 2207/30261; G06T 2207/10152; G06T 2207/20224; G06T 2207/30252; G06T 2207/30256; G06T 2207/10016; B60R 2300/307; B60R 2300/8093
USPC .......................... 348/143, 148, 241; 382/103
See application file for complete search history.

(56) References Cited

U.S. PATENT DOCUMENTS 5,844,682 A * 12/1998 Kiyomoto et al. ......... 356/237.1
2005/0051743 A1   3/2005 Yamaguchi
(Continued)

FOREIGN PATENT DOCUMENTS

| JP | 7 311312 | 11/1995 |
| JP | 8 138036 | 5/1996 |

(Continued)

OTHER PUBLICATIONS

Yamamura. "JP08-138036 Translation". May 1996.*
(Continued)

*Primary Examiner* — Christopher S Kelley
*Assistant Examiner* — Zhihan Zhou
(74) *Attorney, Agent, or Firm* — Oblon, McClelland, Maier & Neustadt, L.L.P

(57) ABSTRACT

An object identifying apparatus is disclosed, including: an imaging part, and an object identification processing part. The imaging part receives two polarized lights having a different polarization direction included in light reflected from the object existing in the image pickup area and captures two polarization images. The object identification processing part conducts an identification process for identifying the object existing at a place corresponding to each of multiple process areas in the image pickup area by using the two polarization images captured by the imaging part.

11 Claims, 20 Drawing Sheets

(52) U.S. Cl.
CPC ... *B60R2300/307* (2013.01); *B60R 2300/8093* (2013.01); *G06T 2207/10016* (2013.01); *G06T 2207/10152* (2013.01); *G06T 2207/20224* (2013.01); *G06T 2207/30252* (2013.01); *G06T 2207/30256* (2013.01); *G06T 2207/30261* (2013.01)

(56) References Cited

U.S. PATENT DOCUMENTS

2009/0315993 A1* 12/2009 Hirai .............................. 348/148
2010/0128334 A1* 5/2010 Nakamura ........................ 359/9
2012/0147187 A1 6/2012 Li et al.

FOREIGN PATENT DOCUMENTS

| JP | 11 175702 | 7/1999 |
|---|---|---|
| JP | 2005 83850 | 3/2005 |
| JP | 2007 322374 | 12/2007 |
| JP | 2009-9209 | 1/2009 |
| JP | 2009 25198 | 2/2009 |
| JP | 2009 59260 | 3/2009 |
| JP | 2009-292332 | 12/2009 |

OTHER PUBLICATIONS

Noji et al. "JP2007-322374 Translation". Dec. 2007.*
Sato et al. "JP2009-009209 Translation". Jan. 2009.*
Japanese Office Action issued Aug. 29, 2014, in Japan Patent Application No. 2010-243989.
International Search Report Issued Feb. 1, 2011 in PCT/JP10/73069 Filed Dec. 15, 2010.
Japanese Office Action issued Aug. 8, 2014, in Japan Patent Application No. 2010-243925.

* cited by examiner

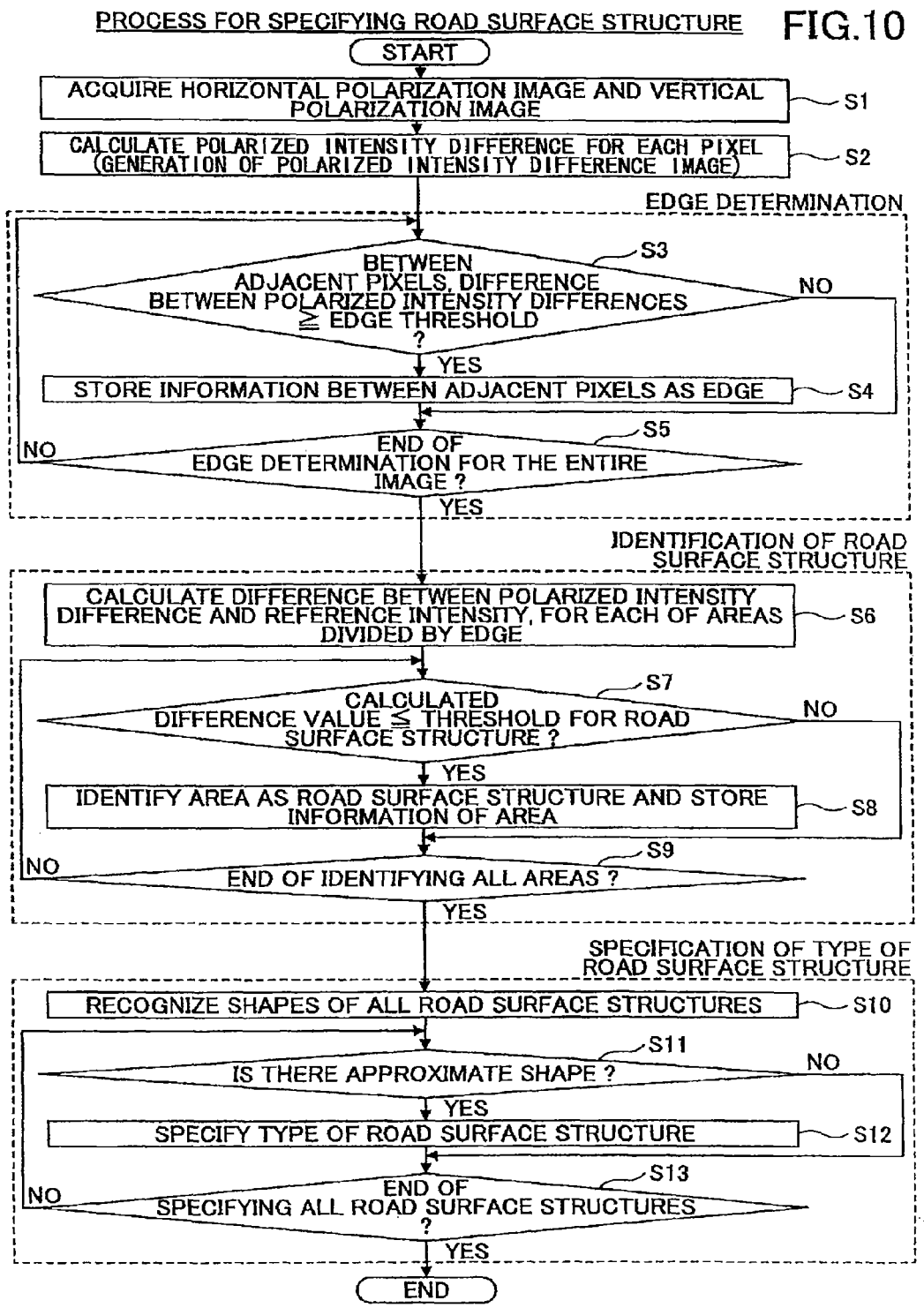

37
BOTTS' DOTS

37
BOTTS' DOTS

38 COAL TAR

38 COAL TAR

OBJECT IDENTIFYING APPARATUS, MOVING BODY CONTROL APPARATUS, AND INFORMATION PROVIDING APPARATUS

TECHNICAL FIELD

The present invention generally relates to an object identifying apparatus for identifying an object existing within an image pickup area, a moving body control apparatus for controlling a movement of a moving body such as a vehicle, a ship, an aircraft, or an industrial robot, by using an identification result of the object identifying apparatus, and an information providing apparatus for providing instructive information to a driver of the moving body.

BACKGROUND ART

As an object identifying apparatus, for example, an apparatus used for a driver assistance system such as an ACC (Adaptive Cruise Control) or the like is well-known to reduce an operating load of a driver of a vehicle. In a vehicle drive supporting system, it is required to properly distinguish and identify an object such as an obstacle, a leading vehicle, a traffic lane, or the like, in order to achieve various functions such as an automatic braking function or an alarm function to prevent a vehicle from crashing into an obstacle or the like and to reduce a shock at a crash, a vehicle speed adjustment function for maintaining a distance between itself and the leading vehicle, and a function for supporting prevention of a departure from a driving lane. Accordingly, various object identifying apparatuses have been conventionally presented.

Japanese Laid-open Patent Application No. 11-175702 discloses an object identifying apparatus for identifying a traffic lane (object), in order to detect a line in a road image (photographic image) acquired by capturing an image and to detect a relative displacement of a vehicle with respect to a traffic lane line (white line) for dividing driving lanes of vehicles. This object identifying apparatus is used to overcome problems in that sunlight or the like causes a specular reflection when there is a puddle on the road due to rain. Thus, the puddle is imaged with brightness of a similar degree as the traffic lane line (white line) on the road, and a portion of the puddle is misrecognized with the traffic lane line.

In detail, in order to remove the portion of the puddle from the image of the road prior to a white line identification process, the portion of the puddle is removed by eliminating a specular reflection component alone from the image of the road, and the white line is recognized from residual scattered light component. A method for eliminating the specular reflection component alone uses facts in that a horizontal polarized component of the specular reflection is approximately zero at Brewster's angle and the scattered light component includes a vertical polarized component and a horizontal polarized component approximately at the same amount, and conducts the following. That is, the method calculates a difference between the vertical polarized component and the horizontal polarized component in the image of the road, and multiplies a difference value with a correction coefficient for eliminating the specular reflection component in response to an incident angle included in the horizontal polarized component, so as to calculate the specular reflection component. Next, the method subtracts the calculated specular reflection component from the horizontal polarized component, and acquires an image of a scattered light component from which the specular reflection component alone is eliminated from the image of the road.

However, regarding the above-described conventional object identifying apparatus for identifying an object existing in an image pickup area, there are insufficient types of objects possible for the apparatus to conclusively specify what an object is. The conventional object identifying apparatus is confined to types of behaviors of objects used to identify an object. That is, if the types of behaviors of objects used to identify an object are increased, a segmentation of object identification can be further segmented. As a result, an accuracy of object identification can be improved, and the types of behaviors of objects can be increased.

For example, one of the conventional object identifying apparatuses identifies a difference between amounts of reflected light (amounts of light received) from objects existing in an image pickup area, that is, the white line (object) on a road due to a luminance difference in a photographic image. In this object identifying apparatus, the white line on the road is identified from other objects by using a feature of reflected light being different. In a case of identifying an object by using this feature, as described in Japanese Laid-open Patent Application No. 11-175702, an object (puddle or the like) having an amount of reflected light being approximately the same as that of the white line cannot be distinguishably identified from the white line. In response to this problem, the object identifying apparatus disclosed in Japanese Laid-open Patent Application No. 11-175702, it is possible to distinguishably identify the white line and the puddle which are objects having approximately the same amount of the reflected light, by using the specular reflection.

In addition, for example, in other conventional object identifying apparatuses, a shape of an object as another feature in the photographic image is used, and the shape of the object comprehended from the photographic image is compared with a shape template of an object to be conclusively specified to identify the object.

Since types of features of an object used to identify an object are limited, the above-described problems, regarding insufficient types of objects possible for the apparatus to conclusively specify what an object is, are raised not only to the object identifying apparatus used for the driver assistance system but also to various object identifying apparatuses including an apparatus used for a robot control.

Since an expense is increased, it is not preferable to additionally prepare a new detection device for detecting a new feature in response to increasing types of behavior of objects used to identify an object, to overcome the above problems. Accordingly, it is beneficial in a viewpoint of expense, if it is possible to detect the new feature by using an imaging part which is a detection device generally used to detect a reflection light amount (luminance) from an object, in the conventional object identifying apparatus.

Also, as another conventional object identifying apparatus, Japanese Laid-open Patent Application No. 2009-59260 discloses a three-dimensional object identifying apparatus in which even if two objects, which are the same color and are overlapped with each other, can be appropriately distinguished. The three-dimensional object identifying apparatus uses a feature in that main axis directions of polarized lights of two objects being the same color are not identical, and distinguishably recognizes two same color objects even if these objects are overlapped. In detail, the three-dimensional object identifying apparatus acquires an image through multiple polarizers, calculates a polarized component in a predetermined image portion acquired respectively from the multiple polarized lights being different polarization directions, by using a photo acceptance amount of the predetermined image portion, and also, calculates the polarized component for the entire image. Next, the three-dimensional object identifying apparatus segments an area in which the main axis directions of the polarized lights included in the polarized component are identical, calculates a movement direction of each of the segmented, areas, and identifies an image portion including areas in which the movement directions are the same, as a single object.

In the above conventional three-dimensional object identifying apparatus, in general, by using luminance differences in the photographic image, an edge is extracted between a plane object (for example, asphalt of a road surface) existing in a predetermined plane and a solid object (for example, a leading vehicle) having an outer surface facing towards a different direction than a direction of the predetermined plane. Thus, an area segmented by the edge is recognized as the solid object. However, in a conventional method using luminance differences to distinguishably identify the solid object and the plane object, there are problems in that if the luminance differences are not distinctly shown in the photographic image, it is difficult to identify separately the solid object and the plane object at a high accuracy.

Also, the above conventional three-dimensional object identifying apparatus, in general, by using luminance differences in the photographic image, an edge is extracted between a plane object (for example, asphalt of a road surface) existing in a predetermined plane and a solid object (for example, a sidewall at a road edge, a guard rail, a power pole, a street lamp, and obstacles at the road edge such as a step of pedestrian path and the like) having an outer surface facing towards a different direction than a direction of the predetermined plane. Thus, an area segmented by the edge is recognized as the solid object. However, in a conventional method using luminance differences to distinguishably identify the solid object and the plane object, if there is a portion having greatly different luminance in the same plane object, a border of the portion is inappropriately extracted as an edge. There is a problem in that even the single plane object includes the portion, the portion and another portion in the same plane object are improperly recognized as separate objects. In detail, for example, a great luminance difference is shown between a sunlit portion and a shaded portion on a road surface. As a result, the shade portion (a weak luminance portion) is improperly recognized separately from the sunlit portion (a strong luminance portion). Due to this improper-recognition, for example, if the ACC is applied, the ACC may recognize the shade portion as an obstacle such as the sidewall existing at the road edge, and may conduct a collision avoidance operation. Thus, this improper recognition may cause a wrong control or a wrong process.

The above problems are raised not only to the three-dimensional object identifying apparatus used for the driver assistance system but also to various three-dimensional object identifying apparatuses including an apparatus used for the robot control.

Since an expense is increased, it is not preferable to additionally prepare a new detection device for detecting a new feature in response to increasing types of behavior of objects used to identify an object, to overcome the above problems. Accordingly, it is beneficial in a viewpoint of expense, if it is possible to detect the new feature by using an imaging part which is a detection device generally used to detect a reflection light amount (luminance) from an object, in the conventional three-dimensional object identifying apparatus.

DISCLOSURE OF THE INVENTION

The present invention solves or reduces one or more of the above problems.

In an aspect of this disclosure, there is provided an object identifying apparatus for identifying an object existing in an image pickup area, the object identifying apparatus including: an imaging part configured to receive two polarized lights having a different polarization direction included in light reflected from the object existing in the image pickup area and capture two polarization images; and an object identification processing part configured to conduct an identification process for identifying the object existing at a place corresponding to each of multiple process areas in the image pickup area by using the two polarization images captured by the imaging part.

Moreover, there is provided a moving body control apparatus, including: an object identifying part configured to capture surroundings of a moving body as an imaging object, and to identify an object existing in the imaging object; and a movement control part configured to conduct a movement control for the moving body based on an identification result of the object identifying part, wherein the object identifying part includes: an imaging part configured to receive two polarized lights having a different polarization direction included in light reflected from the object existing in an image pickup area and capture two polarization images; and an object identification processing part configured to conduct an identification process for identifying the object existing at a place corresponding to each of multiple process areas in the image pickup area by using the two polarization images captured by the imaging part.

Furthermore, there is provided an information providing apparatus, including: an object identifying part configured to capture surroundings of a moving body which moves in accordance with a driving operation by a driver, as an imaging object, and to identify an object existing in the imaging object; a useful information generating part configured to generate useful information for the driver by using an identification result of the object identifying part; and an information reporting part configured to report the useful information generated by the useful information generating part, wherein the object identifying part includes: an imaging part configured to receive two polarized lights having a different polarization direction included in light reflected from the object existing in an image pickup area and capture two polarization images; and an object identification processing part configured to conduct an identification process for identifying the object existing at a place corresponding to each of multiple process areas in the image pickup area by using the two polarization images captured by the imaging part.

In another aspect of this disclosure, there is provided a solid object identifying apparatus for identifying a solid object existing in an image pickup area having an outer surface facing towards a different direction than a predetermined plane, the solid object identifying, apparatus including: an imaging part configured to receive two polarized lights having a different polarization direction included in light reflected from an object existing in the image pickup area; and a solid object identification processing part configured to conduct a solid object identification process for determining whether or not the object existing at a place corresponding to each of process areas in the image pickup area is the solid object, by using two polarization images captured by the imaging part.

In a further aspect of this disclosure, there is provided a solid object identifying apparatus for identifying a solid object existing in an image pickup area having an outer surface facing towards a different direction than a predetermined plane, the solid object identifying apparatus including: an imaging part configured to receive two polarized lights having a different polarization direction included in light reflected from an object existing in the image pickup area; a luminance calculating part configured to divide each of two polarization images captured by the imaging part into predetermined process areas, and to calculate a total luminance value in the two polarization images for each of the predetermined process areas; a polarized intensity difference calculating part configured to calculate a polarized intensity difference indicating a ratio of a polarized intensity difference value between the two polarization images to the total luminance value, for each of the process areas; and a solid object identification processing part configured to conduct a solid object identification process for identifying whether or not an object existing at a place corresponding to each of the process areas in the image pickup area is the solid object, by using the total luminance value and the polarized intensity difference.

BRIEF DESCRIPTION OF THE DRAWINGS

Other objects, features, and advantages of the present invention will become more apparent from the following detailed description when read in conjunction with the accompanying drawings, in which:

FIG. 10 is a flowchart for explaining a flow of a process for specifying a road surface structure.

BEST MODE FOR CARRYING OUT THE INVENTION

In the following, an embodiment of the present invention will be described with reference to the accompanying drawings.

An embodiment will be described in which the present invention is applied to a driver assistance system as a moving body control apparatus and an information providing apparatus.

Figure 1:
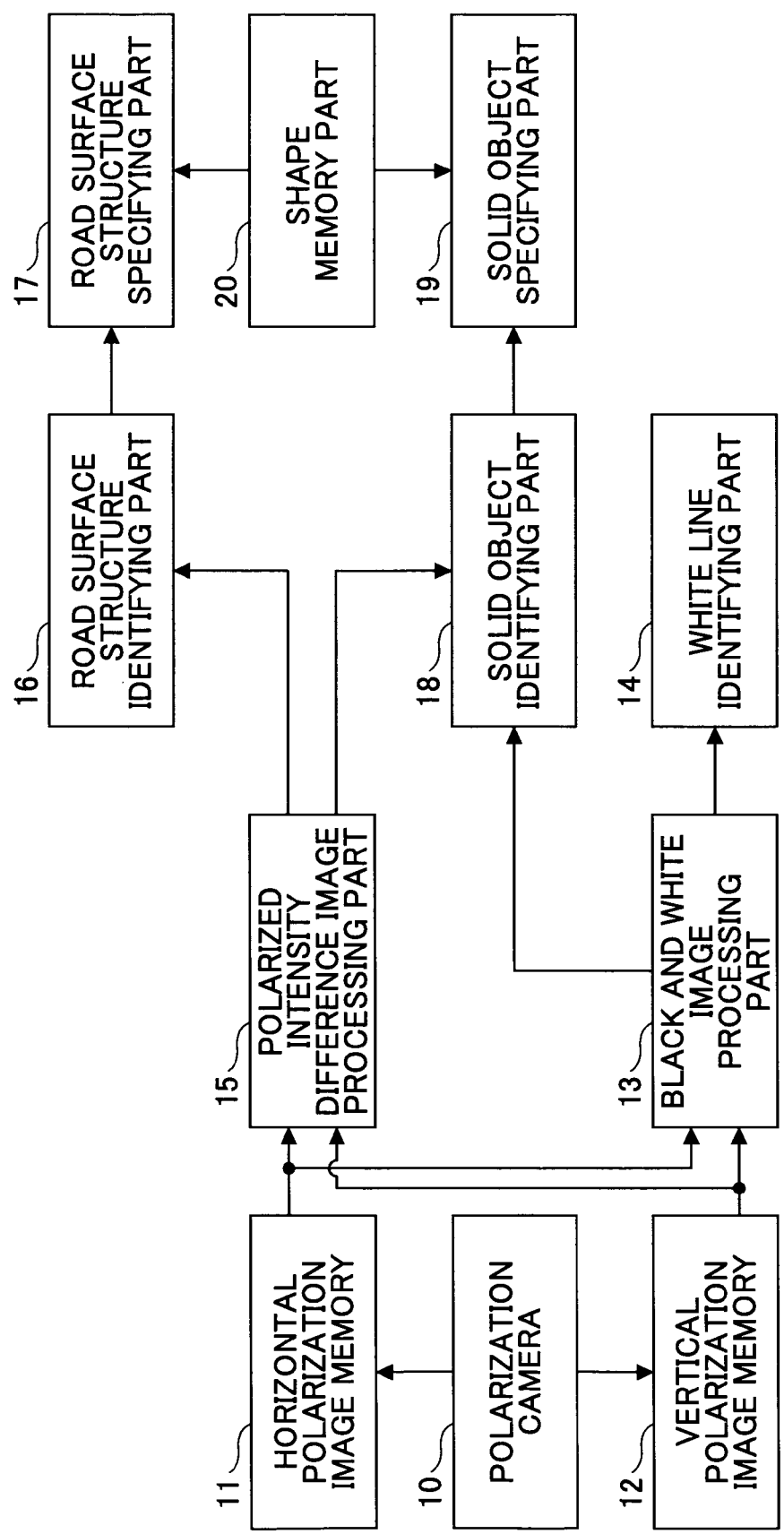
FIG. 1 is a diagram illustrating a functional configuration of a driver assistance system according to an embodiment.

FIG. 1 is a block diagram illustrating a functional configuration of the driver assistance system according to the embodiment.

A landscape around a vehicle as a moving body, including a road surface (movement surface) on which the vehicle is driving, is taken by a polarization camera 10 as an imaging part mounted on a vehicle (not shown). Raw polarization image data including a vertical polarized intensity (hereinafter, simply called a "S-polarized intensity") and a horizontal polarized intensity (hereinafter, simply called a "P-polarized intensity") are acquired. Horizontal polarization image data acquired from P-polarized intensity data included in the raw polarization image data are stored in a horizontal polarization image memory 11, and vertical polarization image data acquired from S-polarized intensity data included in the raw polarization image data are stored in a vertical polarization image memory 12. These two sets of image data are respectively sent to a black and white image processing part 13 as a luminance calculating part and a polarized intensity difference image processing part 15 as a luminance difference calculating part, or as a polarized intensity difference calculating part and a relative polarized intensity difference calculating part.

The polarization camera 10 picks up a peripheral image, for example, which includes pixels being a mega-pixel size, by an image pickup device such as a CCD (charge-coupled device) or a CMOS (complementary metal oxide semiconductors) as a light receiving device. It is preferable for polarization camera 10 to consecutively pick up the peripheral image at a shorter interval close to real time. For example, the polarization camera 10 may be attached to a rear-view mirror, and may pick up a landscape (a front view including a road surface) in front of the vehicle. The polarization camera 10 may be attached to a side mirror, and may pick up a lateral landscape of the vehicle. Alternatively, the polarization camera 10 may be attached to a back door, and may pick up a rear landscape of the vehicle. In this embodiment, a case in which the polarization camera 10 is attached to the rear-view mirror and picks up the front view of the vehicle will be explained.

Figure 2:
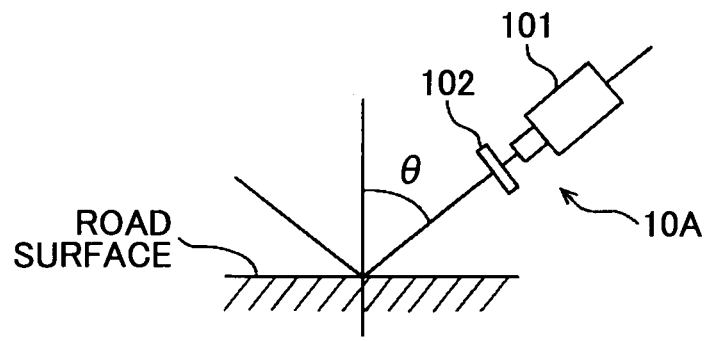
FIG. 2 is a diagram illustrating a first configuration example of a polarization camera to be used for the driver assistance system.

FIG. 2 is a diagram for explaining a first configuration example of the polarization camera 10.

In FIG. 2, as the first configuration example, a polarization camera 10A is a device in which a rotational polarizer 102 which rotationally activates is arranged in front of a camera 101 having an image pickup device such as the CCD. The polarization camera 10A changes a polarization direction of incoming light in response to a rotation angle of the rotational polarizer 102. Accordingly, it is possible for the camera 101 to alternately pick up a P-polarization image and an S-polarization image.

Figure 3:
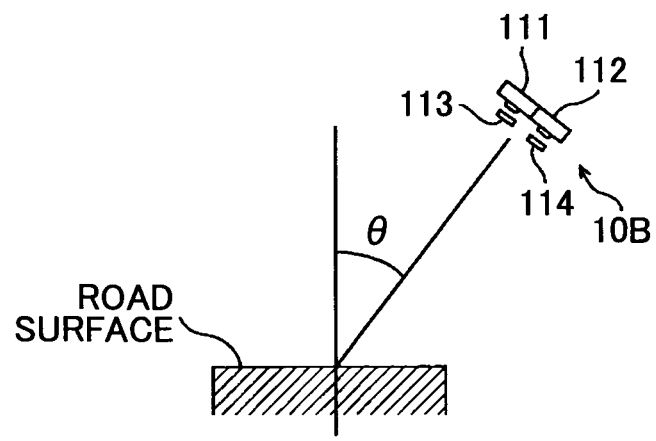
FIG. 3 is a diagram illustrating a second configuration example of a polarization camera to be used for the driver assistance system.

FIG. 3 is a diagram for explaining a second configuration example of the polarization camera 10.

In FIG. 3, as the second configuration example, a polarization camera 10B is a device including two cameras 111 and 112 respectively having an image pickup device such as the CCD or the like. In front of the cameras 111 and 112, an S-polarization filter 113 transmitting S-polarized light and a P-polarization filter 114 transmitting P-polarized light are arranged, respectively. Since the polarization camera 10A illustrated in FIG. 2 alternately picks up the P-polarization image and the S-polarization image by one camera 101, the P-polarization image and the S-polarization image cannot be picked up simultaneously. On the other hand, the polarization camera 10B illustrated in FIG. 3 can simultaneously pick up the P-polarization image and the S-polarization image.

Figure 4:
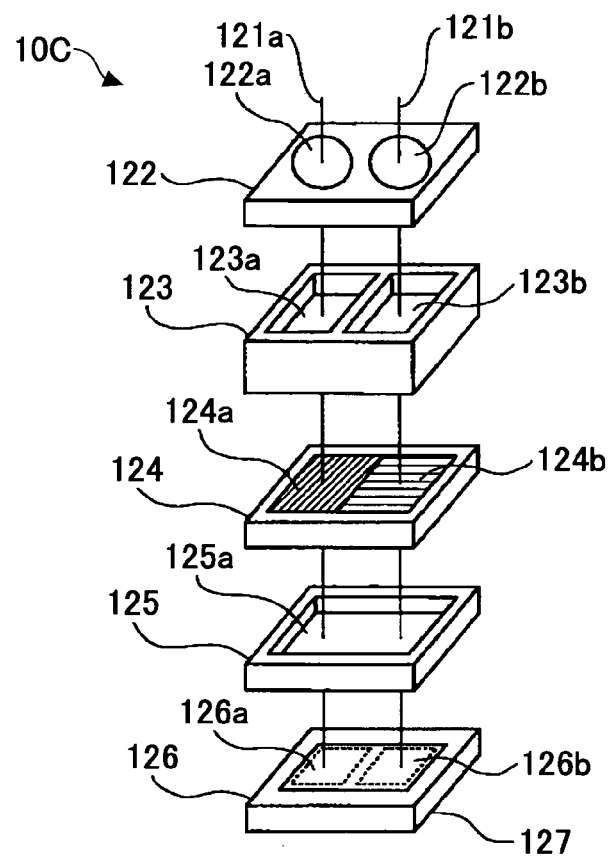
FIG. 4 is a diagram illustrating a third configuration example of a polarization camera to be used for the driver assistance system.

FIG. 4 is a diagram for explaining a third configuration example of the polarization camera 10.

In FIG. 4, as the third configuration example, a polarization camera 10C is provided with image pickup devices respective for the P-polarization image and the S-polarization image, similar to the polarization camera 10B illustrated in FIG. 3. Different from the polarization camera 10B, the image pickup devices are arranged closer to each other. Thus, the polarization camera 10C can be miniaturized more than the polarization camera 10B illustrated in FIG. 3. In the polarization camera 10C illustrated in FIG. 4, a lens array 122, a light shielding spacer 123, a polarization filter 124, a spacer 125, and a solid-state image sensing unit 126 are layered. The lens array 122, includes two image pickup lenses 122a and 122b. The two image pickup lenses 122a and 122b are separately formed by respective single lenses having the same shape such as aspheric lenses or the like, so that respective light axes 121a and 121b are mutually parallel and are arranged on the same plane. The light shielding spacer 123 includes two opening parts 123a and 123b, and is arranged at an opposite side to an object side with respect to the lens array 122. Two opening parts 123a and 123b are passed through a predetermined size with a central focus on the respective light axes 121a and 121b. A light reflex process is conducted to internal surfaces of the opening parts 123a and 123b by a black coat, a roughened surface, or delustering. The polarization filter 124 is an area-dividing type of a polarization filter including two polarization areas 124a and 124b in which polarization planes are 90 degrees different from each other, and is arranged at an opposite side to the lens array 122 with respect to the light shielding spacer 123. The polarization areas 124a and 124b transmit only an oscillation component (polarization component) in a direction along the respective polarization plane, in non-polarized light in which an electromagnetic field oscillates in an unspecified direction, and forms straight polarization light. By using a wire grid method by using a refined odd-shape of metal, an auto-cloning type of photonic crystal method, or the like, it is possible to acquire the area-dividing type of a polarization filter in which a boundary portion is clear. The spacer 125 is formed to be a rectangle-frame shape including an opening part 125a which passes through an area for the polarization area 124a and the polarization area 124b of the polarization filter 124, and is arranged at an opposite side to the shielding space 123 with respect to the polarization filter 124. The solid-state image sensing unit 126 includes two solid-state image sensing devices 126a and 126b mounted on a substrate 127, and is arranged at an opposite side of the polarization filter 124 with respect to the spacer 125. In this embodiment, for sensing black and white, the solid-state image sensing devices 126a and 126b do not include a color filter. In a case of sensing a color image, the solid-state image sensing devices 126a and 126b are provided with color filters, respectively.

Figure 5:
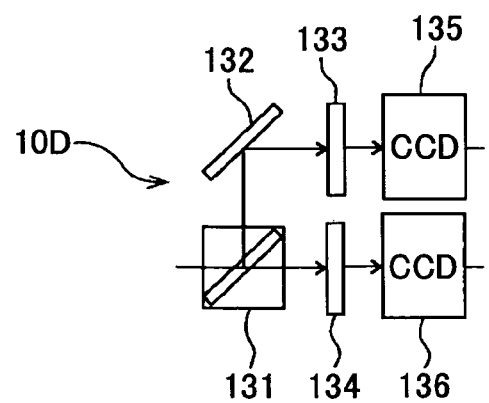
FIG. 5 is a diagram illustrating a fourth configuration example of a polarization camera to be used for the driver assistance system.

FIG. 5 is a diagram for explaining a fourth configuration example of the polarization camera 10.

In FIG. 5, as the fourth configuration example, a polarization camera 10D includes a half mirror 131 having transparency of 1:1, a reflection mirror 132, an S-polarization filter 133, a P-polarization filter 134, a CCD 135 for an S-polarization and for accepting the S-polarized light through the S-polarization filter 133, and a CCD 136 for a P-polarization and for accepting the P-polarized light through the P-polarization filter 134. The polarization camera 10B in FIG. 3 and the polarization camera 10C in FIG. 4 can simultaneously pick up the S-polarization image and the P-polarization image. However, in both cameras 10B and 10C, an azimuth difference is caused. On the contrary, the polarization camera 10D (illustrated in FIG. 5) simultaneously picks up the S-polarization image and the P-polarization image by using the same light accepted through the same image pickup system (lens) which is not shown. Thus, the polarization camera does not cause the azimuth difference. Accordingly, it is not required to conduct a process such as an azimuth difference correction.

Instead of the half mirror 131, a polarizing beam splitter such as a prism can be used to reflect the P-polarized light and transmit the S-polarized light. By using the polarizing beam splitter, the S-polarization filter 133 and the P-polarization filter 134 become unnecessary. Thus, it is possible to simplify an optical system and improve efficiency of using the optical system.

Figure 6:
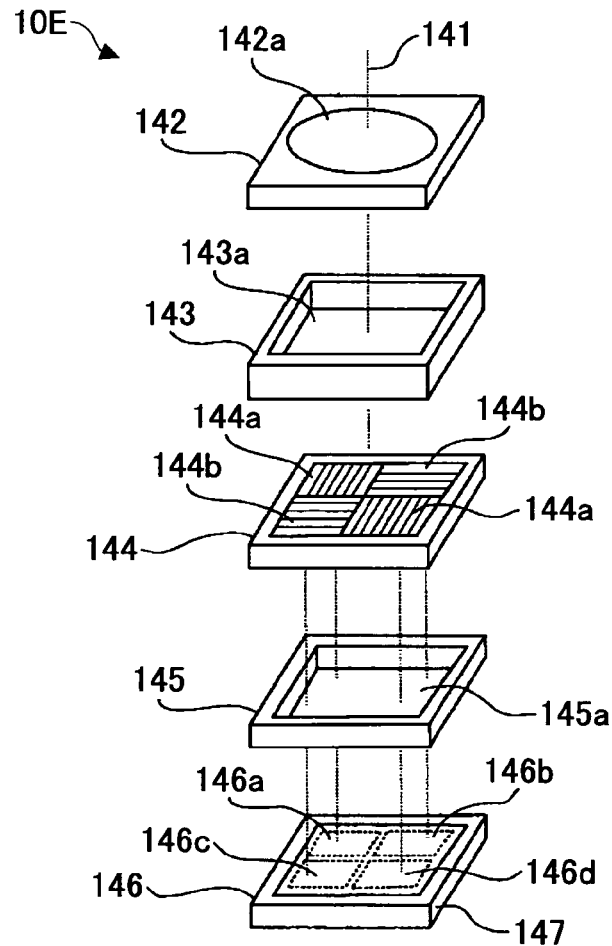
FIG. 6 is a diagram illustrating a fifth configuration example of a polarization camera to be used for the driver assistance system.

FIG. 6 is a diagram for explaining a fifth configuration example of the polarization camera 10.

In the polarization camera 10E illustrated in FIG. 6, a single image pickup lens 142, a light shielding spacer 143, a polarization filter 144, a spacer 145, and a solid-state image sensing unit 146 are layered. In FIG. 6, as the fifth configuration example, a polarization camera 10E is a unit layering camera components along an optical axis 141 of an image pickup lens 142a, similar to the polarization camera 10C illustrated in FIG. 4. However, different to the polarization camera 10C, the S-polarization image and the P-polarization image are picked up by the single image pickup lens 142. Multiple image pickup lenses may be layered with respect to the light axis. Similar to the polarization camera 10D illustrated in FIG. 5, the polarization camera 10E does not cause the azimuth difference between the S-polarization image and the P-polarization image. In addition, the polarization camera 10E can be miniaturized more than the polarization camera 10D illustrated in FIG. 5. The light shielding spacer 143 includes an opening part 143a, and is arranged at an opposite side to an object side with respect to the single image pickup lens 142. The spacer 145 is formed to be a rectangle-frame shape including an opening part 145a which penetrates an area for the polarization area 144a and the polarization area 144b of the polarization filter 144, and is arranged at an opposite side to the shielding space 143 with respect to the polarization filter 144. The polarization camera 10E in FIG. 6 is the area-dividing type of a polarization filter provided with two sets of the polarization areas 144a and 144b in which the polarization planes are 90 degrees different from each other. Due to this configuration, four solid-state image sensing devices 146a, 146b, 146c, and 146d are provided to the polarization camera 10E.

Figure 7:
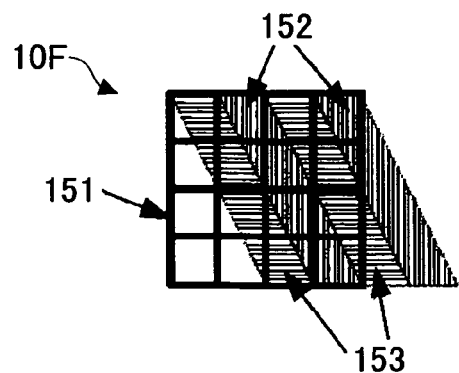
FIG. 7 is a diagram illustrating a sixth configuration example of a polarization camera to be used for the driver assistance system.

FIG. 7 is a diagram for explaining a sixth configuration example of the polarization camera 10.

In FIG. 7, as the sixth configuration example, the area-dividing type of a filter is applied to a polarization camera 10F. In FIG. 7, each of squares aligned in a matrix indicates a light receiving part 151 of each of light receiving devices, areas filled with vertical lines indicate areas for S-polarization filters 152, and areas filled with horizontal lines indicate areas for P-polarization filters 153. In the polarization camera 10F, instead of corresponding to pixels of the light receiving devices with 1:1, each of the areas for the S-polarization filters 152 and the P-polarization filters 153 has a width of one light receiving device in a lateral direction, and has an oblique zonal shape in which an inclination of a border line between the areas indicates 2. That is, the oblique zonal shape has an angle in which a two pixel change in a longitudinal direction is made for one pixel change in the lateral direction. By combining a special filter arrangement pattern as described above with a signal process, even if accuracy of an alignment is insufficient in a case of joining an image pickup device array with an area-dividing filter, it is possible to reproduce each of images transmitted through the filters as a whole screen. Also, it is possible to realize a polarization camera capable of picking up the S-polarization image and the P-polarization image with a lower expense.

Referring back to FIG. 1, the black and white image processing part 13 calculates luminance of black and white (a P-polarized intensity and the S-polarized intensity) for each pixel from the P-polarized intensity data and the S-polarized intensity data in the horizontal polarization image memory 11 and the vertical polarization image memory 12. A black and white image can be generated by using black and white luminance data for all pixels acquired by the calculation. The black and white luminance data calculated by the black and white image processing part 13 are output to a white line identifying part 14 being as a line detection part.

The polarized intensity difference image processing part 15 calculates a polarized intensity difference for each pixel, from the P-polarized intensity data and the S-polarized intensity in the horizontal polarization image memory 11 and the vertical polarization image memory 12. The polarized intensity difference image can be generated by using the polarized intensity difference. The polarized intensity difference is acquired by the following expression (1).

$$\text{Polarized Intensity Difference} = (P\text{-polarized intensity} - S\text{-polarized intensity})/(P\text{-polarized intensity} + S\text{-polarized intensity}) \qquad (1)$$

That is, the polarized intensity difference is a ratio of a difference value (luminance difference value) between the P-polarized intensity and the S-polarized intensity with respect to a total value (luminance total value) of the P-polarized intensity and the S-polarized intensity. In other words, the polarized intensity difference is a difference value between a ratio (P-polarization ratio) of the P-polarized intensity to the luminance total value and a ratio (S-polarization ratio) of the S-polarized intensity to the luminance total value. In this embodiment, a case of subtracting the S-polarized intensity from the P-polarized intensity will be described. Alternatively, the P-polarized intensity can be subtracted from the S-polarized intensity. Data of the polarized intensity difference calculated by the polarized intensity difference image processing part 15 are output to a road surface structure identifying part 16 and a solid object identifying part 18 as an object identification processing part.

The white line identifying part 14 identifies the white line on a driving road by using the following method, based on the black and white luminance data calculated by the black and white image processing part 13. The white line can be any one of various lines for dividing a road, such as an arbitrary color line such as a yellow line or the like, a solid line, a dashed line, a dotted line, a double line, and the like.

A traffic line (dividing line) on a regular road is formed with a high contrast color (for example, white) with respect to a black portion such as asphalt or the like, in order to be easily visible for a driver. Accordingly, the luminance of the traffic line (the white line is applied in this embodiment) is sufficiently greater than an object such as the asphalt or the like existing in other places. Thus, by using the black and white luminance data, it is possible to determine portions brighter than a predetermined value as the white line. The black and white luminance data used in the embodiment are data acquired by using the total value of the P-polarized intensity and the S-polarized intensity obtained from the above-described polarization camera 10.

In a white line identification process according to the embodiment, first, the total value of the P-polarized intensity and the S-polarized intensity acquired from the polarization camera 10 for each pixel is calculated to be a black and white luminance for each pixel by the black and white image processing part 13. The white line identifying part 14 sets a plurality of process lines with respect to the black and white image acquired from the black and white luminance. The process line according to the embodiment is set for a pixel sequence aligned on one horizontal line in the polarized intensity difference image. A direction of the process line is not required to be in a lateral direction and may be in a longitudinal direction or an oblique direction. Also, a pixel number on each process line may be the same or different. Moreover, the process line is not always required to be set with respect to all pixels in the polarized intensity difference image, and may be set for a part of pixels, which is properly selected in the polarized intensity difference image. Furthermore, as described later, instead of the process line, the white line identification process may be performed by a process block unit in which one process block is formed by more than two pixels in each of a column and a row. The white line identifying part 14 calculates a difference of the black and white luminance between two adjacent pixels for each process line, and determines whether or not a calculation result is equal to or greater than a white line edge threshold. When it is determined that the calculation result is equal to or greater than the white line edge threshold, an area between these two adjacent pixels is determined and recorded as the white line edge. By performing the white line identification process for all process lines, it is possible to extract the white line edge in the black and white image.

A result from identifying the white line edge by the white line identifying part 14 can be used for various processes.

For example, one process displays the black and white image (front view image) generated by using luminance data calculated by the black and white image processing part 13 at a display unit as an information notice part including a CRT (Cathode Ray Tube) or a LCD (Liquid Crystal Display) in the vehicle, in which information concerning a white portion in the black and white image is apparently displayed so as to report to the driver as useful information. By applying this process, for example, even if it is difficult for the driver to visually recognize the white line, the driver can comprehend a relative positional relationship between the vehicle of the driver and the white line by viewing the front view image at the display unit. Accordingly, the driver can easily maintain the vehicle in a driving lane divided by the white line.

Moreover, for example, another process may be performed to comprehend the relative positional relationship between the vehicle of the driver and the white line from position information of the white line recognized by the white line identifying part 14, and to determine whether or not the vehicle of the driver departs from a proper driving position on the driving lane divided by the white line. When the vehicle departs from the proper driving position, an alarm sound or the like is conducted. Alternatively, while the vehicle is departing from the proper driving position, an automatic braking function is executed to reduce a speed of the vehicle.

The road surface structure identifying part 16 is a processing part for identifying a structure (hereinafter, called a "road surface structure") existing on a road surface by a method described later, based on the polarized intensity difference calculated by the polarized intensity difference image processing part 15. The road surface structure identifying part 16 outputs an identification result to a road surface structure specifying part 17 and the white line identifying part 14. The road surface structure can be a manhole cover, a metal of a road connection portion existing on a road such as a highway, a land bridge, or the like, a compound structure formed by a metal, a light reflection plate, and the like such as Botts' Dots, a cat's eye, and the like in which a dividing line is formed to divide the driving lane. Moreover, in the embodiment, the road surface structure can be an extraneous material covering a portion on the road, such as a coal tar which is not made intentionally. The road surface structure identifying part 16 identifies a plane object having an outer surface positioned in substantially flush with the road surface, as the road surface structure. The road surface structure specifying part 17 specifies whether the road surface structure is the manhole cover, the road connection portion, the Botts' Dots, or the cat's eye.

The road surface structure identifying part 16 may eliminate the white line from the polarized intensity difference image based on an identification result of the white line edge by the white line identifying part 14, and may conduct the road surface structure identification process for the polarized intensity difference image from which the white line is eliminated. In this case, it is possible to properly eliminate noises including the white line and to improve identification accuracy of the road surface structure.

In this case, the manhole cover is a metal plate being fitted by insertion to an opening part of a manhole, and is generally made of cast-iron being strong and heavy.

Figure 8A:
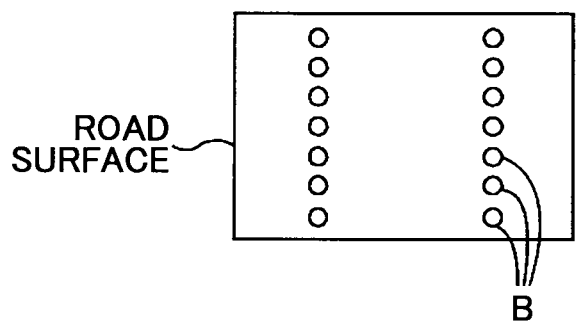
FIG. 8A is a top view of Botts' Dots being objects to identify.
Figure 8B:
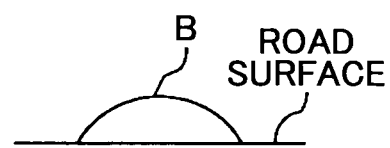
FIG. 8B is a lateral view of the Botts' Dots.

For example, Botts' Dots B in FIG. 8A and FIG. 8B are made of ceramics and are mainly used to form dividing lines for highways in North America. As illustrated in FIG. 8B, the Botts' Dots B are objects which have a circular dome shape approximately a 100 mm in diameter and are embedded on the road surface. As illustrated in FIG. 8A, multiple Botts' Dots B are arranged along the driving lane on the road, and are used as the dividing line.

Figure 9A:
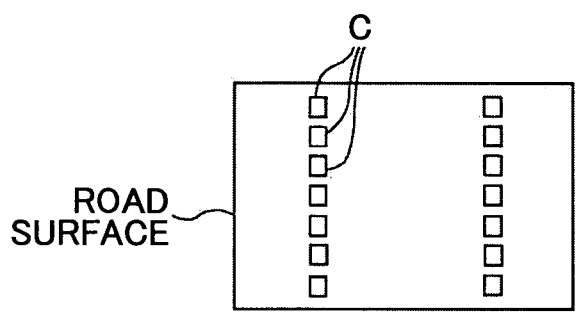
FIG. 9A is a top view of cats' eyes being objects to identify.
Figure 9B:
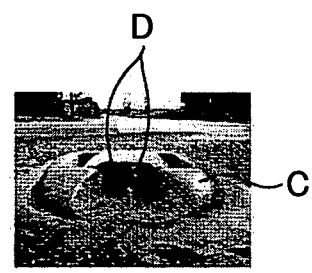
FIG. 9B is a lateral view of the cats' eyes.

Also, cat's eyes C in FIG. 9A and FIG. 9B are used to form the dividing line. As illustrated in FIG. 9B, reflectors D having a feature of reflecting incoming light in the same direction are attached in a body of an approximately rectangle shape. As illustrated in FIG. 9A, the multiple cat's eyes C are arranged along the driving lane on the road, and used as the dividing line.

The Botts' Dots B and the cat's eyes C are arranged to be slightly protruded from the road surface.

The solid object identifying part 18 identifies a solid object existing in the image pickup area of the polarization camera 10 by a method described later, based on the polarized intensity difference calculated by the polarized intensity difference image processing part 15. The solid object can be another vehicle driving on a road surface, a guard rail existing in a vicinity of a road edge of the road surface, a power pole, a street lamp, a sign, an obstacle to the side of a road such as a shoulder or the like at the road edge, an obstacle to avoid colliding with on the road surface or at a road shoulder such as a person, an animal, a bicycle, or the like. That is, the solid object can be any kind of the obstacle having an outer surface facing towards a direction different than the road surface. The solid object identifying part 18 outputs an identification result to a solid object specifying part 19. The solid object identifying part 18 identifies the solid object distinguishably from the road surface, and the plane object in which an outer surface exists substantially flush with the road surface, and the solid object specifying part 19 specifies whether the solid object is another vehicle, the obstacle off the road, or the obstacle to avoid colliding with.

A shape memory part 20 as a shape information storage part stores data of various shape templates as shape information used by the road surface structure specifying part 17 and the solid object specifying part 19. The shape template stored in the shape memory part 20 indicates a shape (shape of a specific object in a photographic image) of an object (specific object) to be specified by the road surface structure specifying part 17 and the solid object specifying part 19, in which the object (specific object) is taken by the polarization camera 10. For example, a shape template of the manhole cover (round shape) indicates an oval shape since the polarization camera 10 captures an image of the manhole cover on the road surface from a diagonally upper direction. It should be noted that the shape template may include size information. In this embodiment, for example, the shape template to be used by the road surface structure specifying part 17 can be a shape template for specifying the manhole cover, a shape template for specifying the dividing line formed by the Botts' Dots or the cat's eyes, and a shape template for specifying the road connection portion existing on the road such as a highway, a land bridge, or the like. Also, for example, the shape template to be used by the solid, object specifying part 19 can be a shape template for specifying another vehicle, a shape template for specifying for the power pole or the street lamp, and a shape template for specifying the step portion at the road edge. In addition, other shape templates may be prepared to specify objects other than the above-exemplified objects if the objects can be specified from their shapes.

The road surface structure specifying part 17 compares a shape of an image area identified as the road surface structure with each of the shape templates stored in the shape memory part 20, based on the identification result of the road surface structure identification part 16. Then, the road surface structure specifying part 17 specifies by a method described later whether the road surface structure is the manhole cover, the road connection portion, the dividing line formed by the Botts' Dots or the cats' eyes, or another road surface structure other than these.

The solid object specifying part 19 compares a shape of an image area identified as the solid object with the shape templates stored in the shape memory part 20 based on the identification result of the solid object identifying part 18. Then, the solid object specifying part 19 specifies by a method described later whether the solid object is another vehicle, the obstacle outside the road, the obstacle to avoid colliding with, or another solid object other than these.

Next, in the driver assistance system according to the embodiment, a flow of a process for specifying the road surface structure will be described.

FIG. 10 is a flowchart for explaining the process for specifying the road surface structure.

When raw polarization image data are acquired by the polarization camera 10, horizontal polarization image data acquired from the P-polarized intensity included in the raw polarization image data are stored in the horizontal polarization image memory 11. Simultaneously, vertical polarization image data acquired from the S-polarized intensity included in the raw polarization image data are stored in the vertical polarization image memory 12 (step S1).

After that, the polarized intensity difference image processing part 15 calculates the polarized intensity difference (identification index value) for each pixel from the P-polarized intensity data and the S-polarized intensity data in the horizontal polarization image memory 11 and the vertical polarization image memory 12, by using the above expression (1) (step S2). Data of the polarized intensity difference images acquired from calculation results are stored in an image memory (not shown) in the polarized intensity difference image processing part 15.

Next, an edge determination process will be described.

When the polarized intensity difference image is acquired, the polarized intensity difference image processing part 15 sets multiple process lines with respect to the different polarization image. The process line according to the embodiment is set for a pixel sequence aligned on a horizontal line in the different polarization image. A direction of the process line is not always required to be in a lateral direction, and may be in a longitudinal direction or an oblique direction. Also, the pixel number can be the same or different for each process line. The process line is not always required to be set for all pixels in the different polarization image, and may be set for a portion of pixels which is properly selected in the different polarization image.

Instead of the process line, the edge determination process may be performed by a process block unit in which one process block is formed by more than two pixels in each of a column and a row. In this case, for example, the edge determination process described later sets multiple process blocks for the different polarization image, and calculates a standard deviation indicating a dispersion amount (scatter degree) of the different polarized intensity. When the standard deviation is equal to or greater than a reference deviation threshold, it is determined that an edge exists in the process block. It should be noted that the process block can be set in an oblong section, and may be set in another shape section. For example, a size of the process block may be approximately 10×10 pixels. Each of process blocks may be the same size or a different size. Instead of the standard deviation, a statistical value may be used such as dispersion, an average deviation, or the like.

The polarized intensity difference image processing part 15 calculates a difference of the polarized intensity difference between two adjacent pixels for each process line, and determines whether or not a calculation result is equal to or greater than a predetermined edge threshold (step S3). When it is determined that the calculation result is equal to or greater than a predetermined edge threshold, the polarized intensity difference image processing part 15 stores information between the two adjacent pixels concerning the determination, as an edge (step S4). By conducting the above-described steps S3 and S4 (step S5), it is possible to specify a borderline between different objects in the polarized intensity difference image.

In a related edge determination process, in general, a difference of a black and white luminance between adjacent pixels is calculated for each process line, and it is determined that a calculation result is equal to or greater than a predetermined edge threshold. However, in the related edge determination process, for example, regarding a border between different objects having approximately the same degree of reflection (black and white luminance) received by a camera, such as the manhole cover, the asphalt, and the like, the different objects cannot be properly distinguished and an edge cannot be determined. On the contrary, the edge determination process according to the embodiment can determine the edge by using the polarized intensity difference, instead of the black and white luminance. Accordingly, it is possible to determine the edge between the different objects having approximately the same degree of reflection at higher accuracy. In the following, this more accurate determination will be explained.

Figure 11:
FIG. 11 is a diagram illustrating one example of a black and white image (luminance image) generated by a black and white image processing part from raw polarization image data acquired by the polarization camera.

FIG. 11 is a diagram illustrating one example of the black and white image (luminance image) generated by the black and white image processing part 13 from the raw polarization image data acquired by the polarization camera 10.

Figure 12:
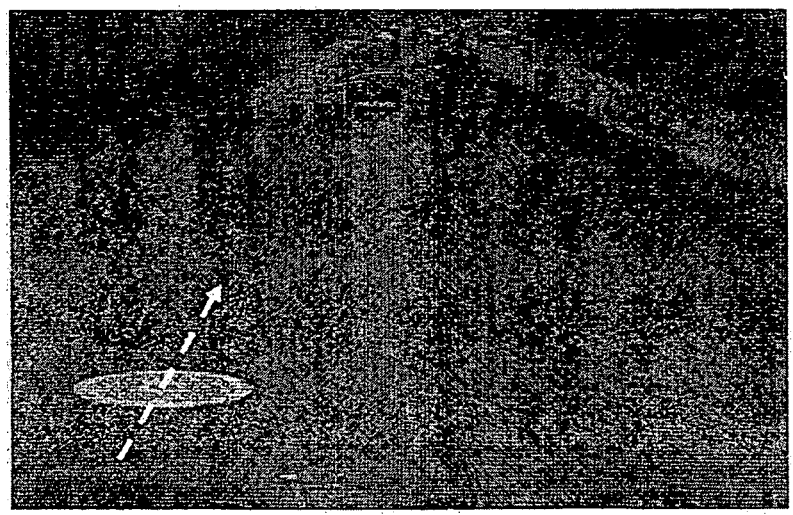
FIG. 12 is a diagram illustrating a polarized intensity difference image generated by a polarized intensity difference image processing part from the raw polarization image data acquired by the polarization camera.

FIG. 12 is a diagram illustrating the polarized intensity difference image generated by the polarized intensity difference image processing part 15 from the raw polarization image data.

Figure 13:
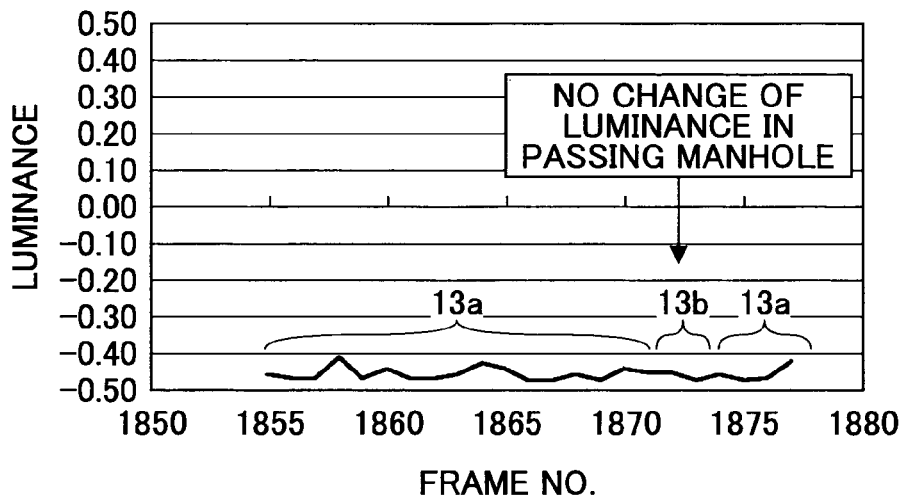
FIG. 13 is a graph plotting luminance values acquired along a white dashed arrow in FIG. 11.

FIG. 13 is a graph plotting luminance values acquired along a white dashed arrow in FIG. 11.

Figure 14:
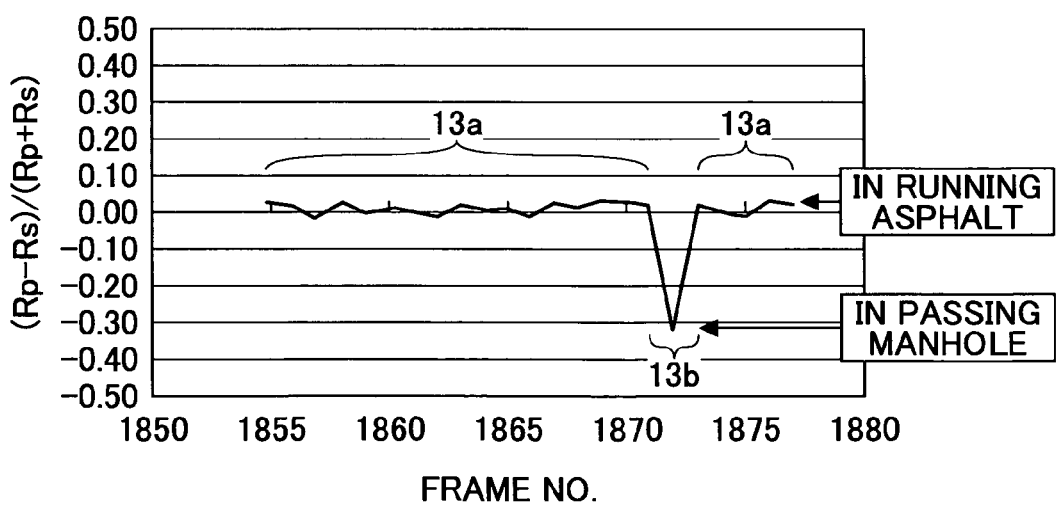
FIG. 14 is a graph plotting luminance values acquired along a white dashed arrow in FIG. 12.

FIG. 14 is a graph plotting the polarized intensity difference acquired along a white dashed arrow in FIG. 12.

As seen from the graph in FIG. 13, the luminance values indicate approximately the same value (within a range from −0.4 to −0.5) in an area 13a of the asphalt and an area 13b of the manhole cover, and there is no change of the luminance values between these areas 13a and 13b. On the contrary, as seen from the graph in FIG. 14, the polarized intensity difference in the area 13a of the asphalt is approximately zero. On the contrary, the polarized intensity difference in the area 13b of the manhole cover is approximately −0.3. A great change of the polarized intensity difference can be seen between these areas 13a and 13b. Accordingly, by setting an appropriate threshold within 0 to −0.3 (for example, −0.2) and using a difference between the polarized intensity differences in these areas 13a and 13b, it is possible at a higher accuracy to determine the edge between the area 13a of the asphalt and the area 13b of the manhole cover, which are difficult to be distinguished by using the black and white luminance.

In an object identification according to the embodiment, instead of the polarized intensity difference, reasons why a relative polarized intensity difference is used will be described later.

Next, a road surface structure identification process conducted by the road surface structure identifying part 16 will be described.

Before explaining the road surface structure identification process, first, a reason why the road surface structure can be identified from the polarized intensity difference is explained.

Light reflected at an object includes a specular reflection component which is so-called "luster", a diffuse reflection component having microscopic irregular structure on an object surface, and an internal dispersion component which is scattered inside the object and is released from the object. An intensity of the reflected light is indicated as a total of three components described above. The specular reflection component can be understood as a part of the diffuse reflection component. The diffuse reflection component and the internal dispersion component can be observed even if a light source illuminating the object is positioned in any one of directions (that is, low dependency of an incident angle). On the other hand, the specular reflection component is a component having a strong dependency of the incident angle and is observed only in a case in that the light source is positioned in an approximately regular reflection direction with respect to a receiving part of the reflected light. Also, a polarization characteristic is the same as the above-described characteristic. As described above, the diffuse reflection component and the internal dispersion component can be observed, independent of the direction of the light source illuminating the object, but their polarization characteristics are different from each other. In detail, it can be assumed that in the diffuse reflection component, Fresnel's reflection characteristic is satisfied in each of micro-areas dividing an object surface. Thus, the diffuse reflection component has the polarization characteristic in which the S-polarized intensity is greater than the P-polarized intensity when non-polarized light is made incident. On the other hand, the internal dispersion component is a component which is dispersed inside the object and is released outside the object. When non-polarized light is made incident, the internal dispersion component is not easily influenced by the polarization component of light entering the object, and has the polarization characteristic in which the P-polarized intensity becomes stronger when the light is released from the inside to the outside of the object.

As illustrated in this embodiment, since almost all of the objects (the asphalt, the manhole cover, and the like) possible to be in the image pickup area have irregularities on a surface, it can be understood that the specular reflection component is less when the front view is picked up from the vehicle. As a result, in the embodiment, it is understood that the diffuse reflection component and the internal dispersion component are dominant in the reflected light from the object existing in the image pickup area of the polarization camera 10. Thus, by comparing the S-polarized intensity with the P-polarized intensity in the reflected light, it is possible to determine that the diffuse reflection component is greater if the S-polarized intensity is stronger. Also, it is possible to determine that the internal dispersion component is greater if the P-polarized intensity is stronger.

Figure 15:
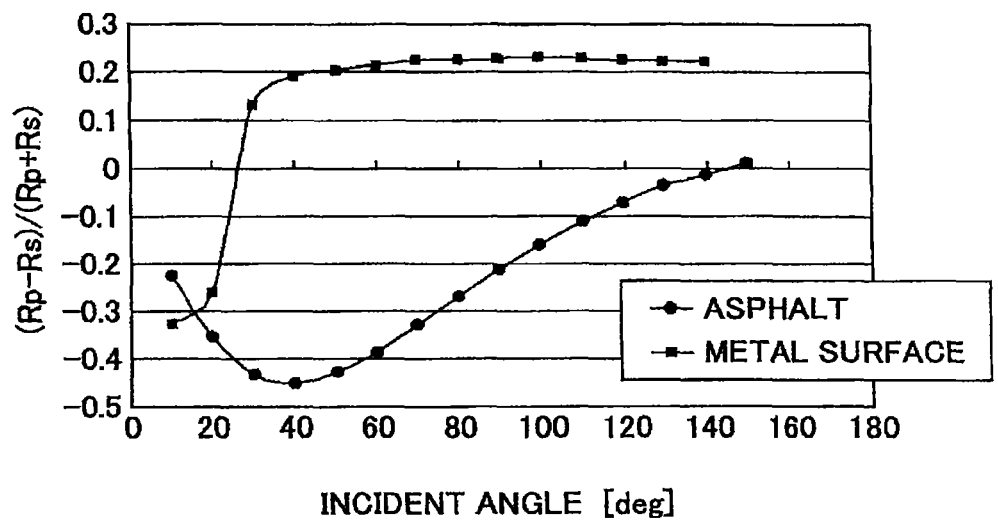
FIG. 15 is a graph illustrating a change example of the polarized intensity difference when a P-polarization image and an S-polarization image are captured by a camera arranged and fixed for each changed position of a light source with respect to an asphalt surface and a metal surface in a laboratory.

FIG. 15 is a graph illustrating a change example of the polarized intensity difference when the P-polarization image and the S-polarization image are captured by a camera arranged and fixed for each changed position of the light source with respect to an asphalt surface and a metal surface (smooth surface) in a laboratory.

In this graph, an abscissa axis indicates the incident angle (light source position) and an ordinate axis indicates the polarized intensity difference. An elevation angle of the camera is in a state inclined at 10 degrees from level. The polarized intensity difference is calculated from luminance information of an approximately center portion in the photographic image of each incident angle. The polarized intensity difference in the graph is a ratio of a value subtracting the S-polarized intensity (Rs) from the P-polarized intensity (Rp) with respect to a total value of the P-polarized intensity (Rp) and the S-polarized intensity (Rs). Accordingly, when the P-polarized intensity is stronger than the S-polarized intensity, the polarized intensity difference is a positive value. When the S-polarized intensity is stronger than the P-polarized intensity, the polarized intensity difference is a negative value.

As seen from the graph in FIG. 15, regarding the asphalt surface, the polarized intensity difference is a negative value approximately at all incident angles. That is, the S-polarized intensity is stronger than the P-polarized intensity, because the diffuse reflection component is dominant in the reflected light from the asphalt surface. On the other hand, regarding the metal surface, the polarized intensity difference is a positive value in the entire area where the incident angle exceeds 30 degrees. That is, the P-polarized intensity is stronger than the S-polarized intensity, because the internal dispersion component is dominant in the reflected light from the metal surface.

As described above, by calculating a difference between the S-polarized intensity and the P-polarized intensity included in the reflected light, it is possible to comprehend whether the diffuse reflection component is stronger or the internal dispersion component is stronger in the reflection characteristic of the object. Accordingly, it is possible to distinguish objects having a different reflection characteristic from each other, such as the asphalt having a stronger diffuse reflection component and the road surface structure having a stronger internal dispersion component, based on the difference between the S-polarized intensity and the P-polarized intensity included in the reflected light.

In general, since a different material has a different refraction index, this characteristic influences the difference between the S-polarized intensity and the P-polarized intensity. Thus, it is possible to distinguish objects having a different material based on the difference between the S-polarized intensity and the P-polarized intensity included in the reflected light.

It should be noted that it is considered that a result illustrated in the graph in FIG. 15 is influenced by a difference of a surface condition between the asphalt surface and the metal surface. The asphalt surface has considerable irregularities, but the metal surface is smooth. Accordingly, values of the S-polarized intensity and the P-polarized intensity being detected are varied depending on the surface condition of an object to be identified. This can be understood since the polarized intensity differences in the area 13a of the asphalt and the area 13b of the manhole cover which is a structure (metal) on the road, which are illustrated in the graph in FIG. 14 showing an experimental result under a circumstance actually applied, are different from the result in the laboratory in FIG. 15. However, between objects being different materials, even if the surface conditions are the same as each other, the reflection characteristics of the objects are different from each other due to their different materials. Each of the reflection characteristics can be comprehended based on a difference between the S-polarized intensity and the P-polarized intensity. Therefore, by using a threshold set considering a real circumstance, it is possible to distinguish between the objects being made of the different materials.

In the road surface structure identification process according to the embodiment, by using the polarized intensity difference as the identification index value in each of areas divided by an edge determined by the above-described edge determination process, it is, possible to determine whether or not each of areas indicates the road surface structure. As described above, by using a difference value between the S-polarized intensity and the P-polarized intensity as the identification index value, it is possible for the road surface structure identification process to determine whether or not each of areas is the road surface structure. However, in a case in which the difference value between the S-polarized intensity and the P-polarized intensity, which is calculated as the identification index value, is resulted in a smaller value due to an insufficient brightness, it becomes difficult to determine whether each of the areas is the road surface structure. On the contrary, in this embodiment, by using the polarized intensity difference in which the difference value is divided by the total value (black and white luminance) of the S-polarized intensity and the P-polarized intensity, even if the brightness is insufficient, a relatively great value can be acquired for the polarized intensity difference as the identification index value. Accordingly, it is possible to determine that each of areas is the road surface structure.

A flow of the road surface structure identification process according to the embodiment will be described below. First, for each of areas divided by an edge determined by the above-described edge determination process, a difference between the polarized intensity difference and a reference of the polarized intensity difference is calculated (step S6). Then, it is determined whether or not the difference is equal to or less than a threshold for the road surface structure defined beforehand (step S7). In this determination, when it is determined that the difference is equal to or less than the threshold for the road surface structure defined beforehand, the area is identified as the road surface structure and information of the area is stored (step S8). By conducting these steps S7 and S8 (step S9), it is possible to comprehend an area showing the road surface structure in the photographic image.

In the embodiment, as the identification index value used for an object identification in the area, instead of using the polarized intensity difference (absolute amount) in the area, a relative polarized intensity difference (relative amount) subtracting the polarized intensity difference in the area from the reference polarized intensity difference is used. Thus, even if a deviance occurs to a calculation value of the polarized intensity difference of an subject area due to influences such as a difference of a circumstance and the like, these influences can be reduced by using the relative amount with respect to the reference polarized intensity difference in which the difference is caused due to the same influences. In this embodiment, as the reference polarized intensity difference, the polarized intensity difference is used in the area of the asphalt occupying most parts of the road surface. In addition, in the embodiment, it is experimentally proved in an actual circumstance that the polarized intensity difference in the road surface structure is equal to or greater than 0.2 at least, when the polarized intensity difference is compared with the polarized intensity difference concerning the asphalt. Accordingly, the relative polarized intensity difference for the road surface structure becomes a negative value less than −0.2 at lowest. Therefore, in this embodiment, −0.2 is applied as a threshold for the road surface structure, and an area, which has the relative polarized intensity difference within a range being equal to or less than this threshold, is identified as the road surface structure.

There is a difference in a luminous intensity of reflected light from an object between an upper portion and a bottom portion. Since the upper portion of the photographic image is a picture portion of an object positioned in the distance, the luminous intensity of the reflected light from the distant object is lower than an object positioned near which is captured in the bottom portion. Considering this difference, a threshold for the road surface structure may be different between one photographic image in the upper portion and another photographic image in the bottom portion.

Moreover, since the bottom portion in the photographic image picturing an object positioned near has a higher accuracy of object identification than the upper portion, it is preferable to define an order of processing the process line from the bottom portion toward the upper portion.

Next, a type specification process of the road surface structure conducted by the road surface structure specifying part 17 will be described.

First, the road surface structure specifying part 17 recognizes a shape of each of areas identified as the road surface structures by the above-described road surface structure identification process (step S10), and determines whether or not there is a shape template approximately the same shape of the identified areas (step S11). In this determination, when it is determined that there is the shape template approximately the same the shape as that of the identified area, the road surface structure of the identified area is specified to be a type associated with the shape template and information concerning the road surface structure and the type is stored (step S12). For example, if a shape template for an elliptical shape is approximately the same as the road surface structure, the road surface structure is specified to be the manhole cover. If a shape template for a stick shape crossing in a lateral direction in the image is approximately the same as the road surface structure, the road surface structure is specified to be the road connection portion. If a shape template for shapes being aligned in a straight line along a movement direction of a vehicle is approximately the same as multiple road surface structures, the multiple road surface structures are specified to be the dividing line formed by the Botts' Dots or the cats' eyes. After the steps S11 and S12 are conducted for all road surface structures (step S13), the process for specifying the road surface structure is terminated.

In detail, an approximated curve is acquired by using edge information in the area of the road surface structure and information of the shape template stored in the shape memory part 20, and a shape approximate identification can be conducted by using a least squares method, a Hough transform, a model equation, or the like. When the approximated curve is acquired, for the edge information toward to the bottom portion being a higher reliable photographic image, it is preferable to greatly weight a candidate value of a shape approximation. As described above, even if there is the edge information misrecognized at the upper portion being a lower reliable photographic image, the edge information normally recognized at the bottom portion being the higher reliable photographic image is stored. Thus, it is possible to properly specify the type of the road surface structure.

Moreover, for example, when the manhole cover is specified, feature points concerning a larger object than the manhole cover may be eliminated beforehand by a morphological operation or the like. Accordingly, it is possible to improve an accuracy of specifying the manhole cover.

In order to improve an accuracy of specifying the type of the road surface structure, a next process may be added.

In this embodiment, the above-described road surface structure specification process (steps S1 through S13) is conducted for the polarization image data acquired by the polarization camera 10 consecutively capturing at predetermined time intervals. By conducting the above-described type specification process of the road surface structure (steps S10 through S13), process results for areas specifying the types of the road surface structure are stored in a predetermined memory. By using previous process results being stored in the predetermined memory (for example, process results concerning latest polarization image data), if it is determined that the type of the road surface structure specified in a current process is the same as a previous process result corresponding to the specified area, this current process result is determined as to be highly reliable result. The current process result being reliable is used in a final specification of the type of the road surface structure. For example, the previous process result corresponding to the specified area concerning the current process result is specified by using the edge information and searching for a position of an area corresponding to the previous process result based on the area concerning the current process result and the moving direction of the vehicle.

In the above, the above-described type specification process of the road surface structure (steps S10 through S13) is described. In order to improve an accuracy of identifying the road surface structure, the previous process result can be used for the road surface structure identification process (steps S6 through S9) in the same manner.

Moreover, each of the edge threshold used for the above-described determination (step S3) of the edge determination process and the threshold of the road surface structure used for the above-described determination (step S7) may be changed depending on a difference of the circumstance of capturing an image. For instance, the edge threshold and the threshold of the road surface structure may be changed depending on a time period such as a day time or a night time, or on weather such as rainy weather or fine weather. This change process can be realized by using time information, information acquired from a rain sensor or a sunshine sensor.

Figure 16:
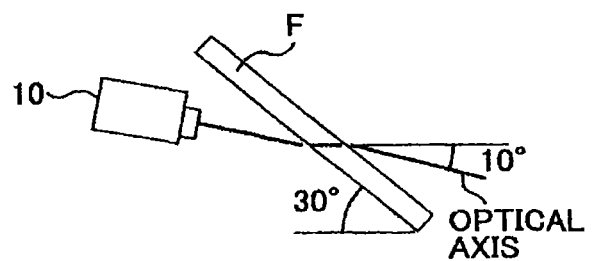
FIG. 16 is a diagram for explaining an influence of a windshield glass.

In a case of attaching the polarization camera 10 according to the embodiment with a rear-view mirror or the like, since a windshield glass influences an image captured by the polarization camera 10, it is preferable to consider the polarization characteristic of the windshield glass. As illustrated in FIG. 16, a glass surface of the windshield glass is arranged at a predetermined angle with respect to a light axis of the polarization camera 10. In general, in a case of arranging a glass plate obliquely to a light path, a polarization state of transmitted light from the glass plate is varied. A calculation of transmission and reflection, a so-called Fresnel, is satisfied. The S-polarization component is reflected at the glass surface more than the P-polarization component. Regarding attenuation factor of the transmitted light, the S-polarization component is greater than the P-polarization component. In detail, for example, as illustrated in FIG. 16, the P-polarization component is attenuated by approximately 8 percent due to a Fresnel reflection at the glass surface, but the S-polarization component is attenuated to be approximately half. In this example, a refraction index of the windshield glass is 1.5.

As described above, it is preferable to consider that the polarization information of light taken into the polarization camera 10 includes an influence of the windshield glass. For example, when the polarized intensity difference is calculated (step S2), an attenuation component at the windshield glass is cancelled for each of the P-polarized intensity and the S-polarized intensity. In the above-described example, the S-polarization component is approximately multiplied by 2, and the P-polarization component is approximately multiplied by 1/0.9. Alternatively, for example, an optical device for cancelling each of the attenuation components for the P-polarized intensity and the S-polarized intensity is arranged between the windshield glass and the polarization camera 10. As the optical device in this case, the optical device, which transmits the S-polarization component through a dead zone and multiplies the P-polarization component by 0.5/0.9, can be used.

In order to reduce weight and expense, it is assumed that a windshield glass made of plastic will be used in the future. It is known that plastic has a double refraction due to an internal distortion, compared with glass. In this case, it is required to consider an influence of the double refraction. In detail, for example, with respect to the polarization component of light taken into the polarization camera 10, the polarized intensity difference is calculated by considering the P-polarized intensity and the S-polarized intensity due to the double refraction.

The result from specifying the type of the road surface structure by the road surface structure specifying part 17 can be used for various processes.

For example, a process result of the road surface structure specifying part 17 may be used for the identification process of a white line edge conducted by the white line identifying part 14. In detail, since an area, in which the type of the road surface structure is specified by the process of the road surface structure specifying part 17, is not a white line area, this area is eliminated from a subject in the identification process of the white line edge conducted by the white line identifying part 14. Therefore, it can be reduced to misrecognize the road surface structure such as the manhole cover or the like with the white line, and accuracy of the recognition of the white line can be improved. The identification process of the white line edge conducted by the white line identification part 14 is described above. However, in a case of conducting a process for identifying the photographic image of an object other than the white line, generally, by eliminating an area, in which the type of the road surface structure is specified from a subject of the identification process, it is possible to improve accuracy of the identification process. For instance, in a system for identifying an obstacle such as a leading vehicle by a sensor fusion based on a ranging result of radar and a photographic image, it is possible to avoid misrecognizing various road surface structures such as the manhole cover, and the like with obstacles. As a result, it is possible to prevent an occurrence of rapidly reducing a speed of the vehicle because the various road surface structures are misrecognized as obstacles.

In addition, for example, the process result of the road surface structure specifying part 17 may be applied to a car navigation system. For instance, vehicle position information indicating a distance, an angle, and the like between the vehicle and the manhole cover is generated from a position of the manhole cover specified based on the process result of the road surface structure specifying part 17, and a further detailed position of the vehicle is specified within a range of the vehicle position calculated by the car navigation system by using the vehicle position information. Therefore, it is possible to improve accuracy of specifying the vehicle position in the car navigation system.

Moreover, for example, from the process result of the road surface structure specifying part 17, it is possible to comprehend positions and directions of the manhole cover, the road connection portion, and the like with respect to the vehicle. Therefore, by using this benefit, it is possible to apply it to an ECU (Electronic Control Unit) for assisting a driver, and the like.

In particular, for example, the result of the road surface structure specifying part 17 for specifying the dividing line formed by the Botts' Dots or the cats' eyes can be used for various processes similar to the identification result of the white line edge by the white line identifying part 14. In detail, for example, one process displays the black and white image (front view image) generated by using luminance data calculated by the black and white image processing part 13 at a display unit as an information notice part including a CRT (Cathode Ray Tube) or a LCD (Liquid Crystal Display) in the vehicle, in which information concerning a white portion in the black and white image is apparently displayed so as to report to the driver as useful information. By applying this process, for example, even if it is difficult for the driver to visually recognize the dividing line, the driver can comprehend a relative positional relationship between the vehicle of the driver and the dividing line by viewing the front view image at the display unit. Accordingly, the driver can easily maintain the vehicle in a driving lane divided by the dividing line.

Moreover, for example, another process may be performed to comprehend the relative positional relationship between the vehicle of the driver and the dividing line from position information of the dividing line recognized by the road surface structure specifying part 17, and to determine whether or not the vehicle of the driver departs from a proper driving position on the driving lane divided by the dividing line. When the vehicle departs from the proper driving position, an alarm sound or the like is conducted. Alternatively, while the vehicle is departing from the proper driving position, an automatic braking function is executed to reduce a speed of the vehicle.

Figure 17:
FIG. 17 is a diagram illustrating an example a black and white image (luminance image) generated by the black and white image processing part from the raw polarization image data acquired from the polarization camera which captures an image of the road surface on which the Botts' Dots are used as the dividing line.

FIG. 17 is a diagram illustrating an example a black and white image (luminance image) generated by the black and white image processing part 13 from the raw polarization image data acquired from the polarization camera 10 which captures an image of the road surface on which the Botts' Dots 37 are used as the dividing line.

Figure 18:
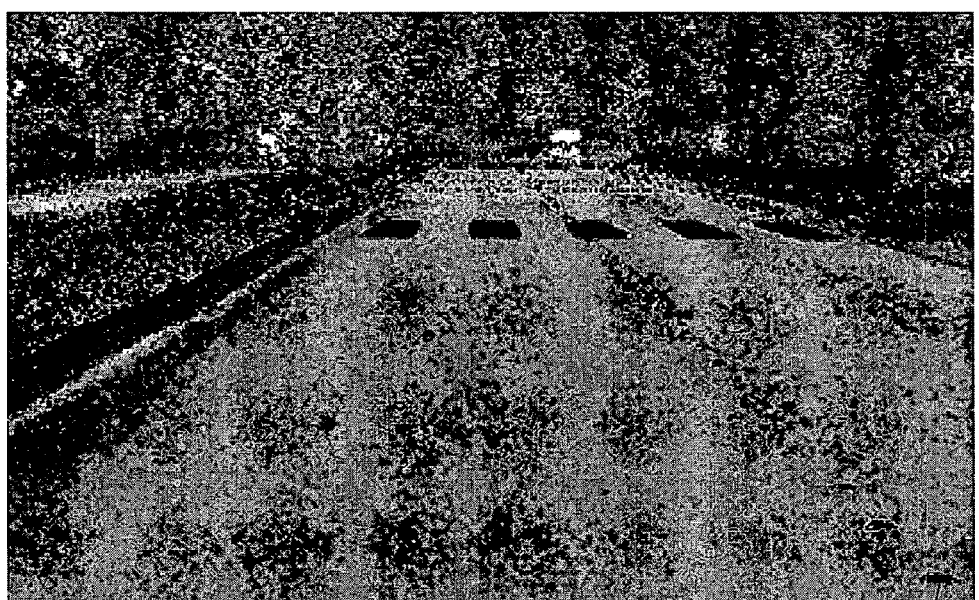
FIG. 18 is a diagram illustrating the polarized intensity difference image generated by the polarized intensity difference image processing part from the raw polarization image data.

FIG. 18 is a diagram illustrating a polarized intensity difference image generated by the polarized intensity difference image processing part 15 from the raw polarization image data.

As seen from a comparison between the black and white image in FIG. 17 and the polarized intensity difference image in FIG. 18, a contrast between the asphalt and the Botts' Dots 37 in the polarized intensity difference image in FIG. 18 is higher than that in the black and white image (luminance image) in FIG. 17. Accordingly, by using the polarized intensity difference image, it is possible to identify an edge between the area of the asphalt and the area of the Botts' Dots 37, even if it is difficult to identify the edge by using the black and white image (luminance image).

Mainly, a case of metal as an identifiable material is described above in this embodiment. Alternatively, other materials can be identified.

Figure 19:
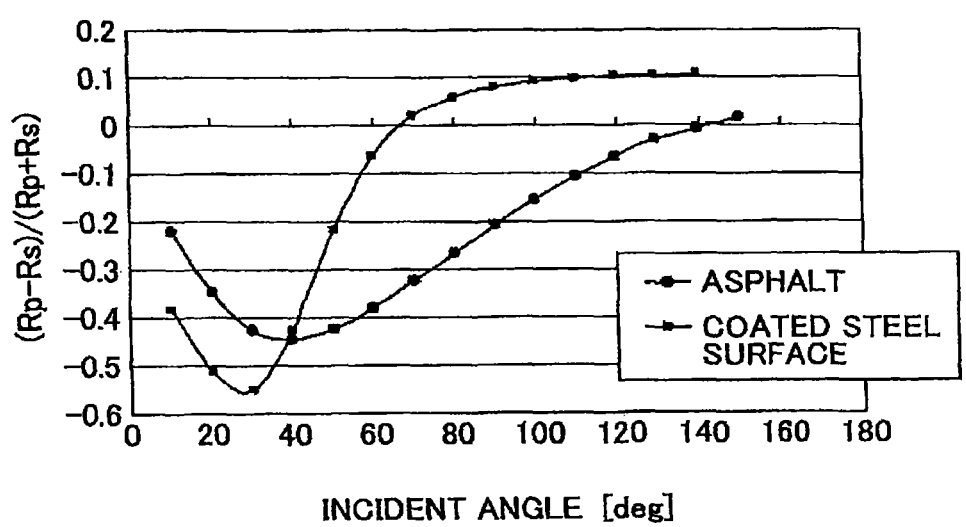
FIG. 19 is a graph indicating a change of the polarized intensity difference in a case in which the P-polarization image and the S-polarization image are captured by the camera arranged and fixed at the light source position changed with respect to a coated surface on which the asphalt surface and steel surface are coated with paint in the laboratory.

FIG. 19 is a graph illustrating a change of the polarized intensity difference in a case in which the P-polarization image and the S-polarization image are captured by a camera arranged and fixed at a light source position changed with respect to a coated surface on which an asphalt surface and steel are coated with paint in the laboratory. The graph in FIG. 19 is illustrated in the same condition as the graph in FIG. 15 comparing the asphalt surface and the metal surface. As seen from the graph in FIG. 19, there is a polarized intensity difference between the asphalt surface and the coated surface. The polarized intensity difference of the coated surface is also different from the polarized intensity difference of the metal surface. Accordingly, it is possible to distinguish and identify the border between the coated surface and the metal surface by a difference between the polarized intensity differences (differences between the polarization characteristics).

Similarly, the polarized intensity difference image can be used not only for the coated surface but also for the road surface structure such as coal tar adhered on the road surface due to a construction or deterioration of the road surface. Thus, it is possible to detect the road surface structure at higher contrast.

Figure 20:
FIG. 20 is a diagram illustrating an example of the black and white image (luminance image) generated by the black and white image processing part from the raw polarization image data acquired by the polarization camera which captures the road surface on which coal tar is adhered.

FIG. 20 is a diagram illustrating an example of the black and white image (luminance image) generated by the black and white image processing part 13 from the raw polarization image data acquired by the polarization camera 10 which captures the road surface on which coal tar 38 is adhered.

Figure 21:
FIG. 21 is a diagram illustrating the polarized intensity difference image generated by the polarized intensity difference image processing part from the raw polarization image data.

FIG. 21 is a diagram illustrating the polarized intensity difference image generated by the polarized intensity difference image processing part 15 from the raw polarization image data.

As seen from comparing the black and white image (luminance image) in FIG. 20 with the polarized intensity difference image in FIG. 21, a contrast between the asphalt and the coal tar 38 in the polarized intensity difference image in FIG. 21 is higher than that the black and white image (luminance image) in FIG. 20. Accordingly, by using the polarized intensity difference image, it is possible to identify the edge between the area of the asphalt and the area of the coal tar 38 at higher accuracy, even if it is difficult to identify the edge in a case of using the black and white image (luminance image).

Next, a flow of a process for specifying a solid object in the driver assistance system according to the embodiment will be described.

Figure 22:
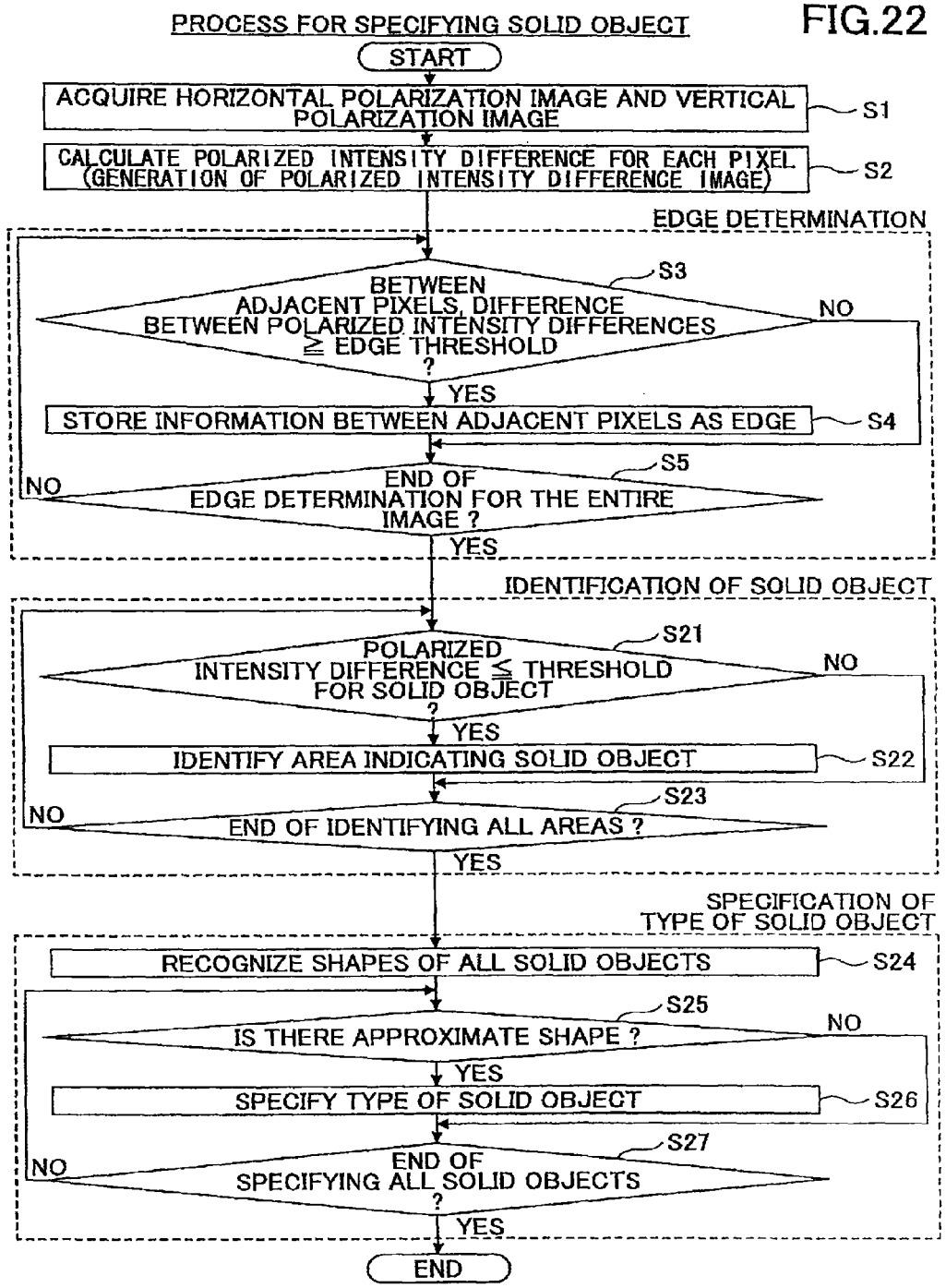
FIG. 22 is a flowchart for explaining a flow of a process for specifying a solid object.

FIG. 22 is a flowchart for explaining the flow of the process for specifying a solid object.

Steps before the edge determination process are the same as the above-described steps in the road surface structure specification process, and explanations thereof will be omitted. However, the edge threshold used in the edge determination process is different from that in the above-described road surface structure specification process. A method for setting the edge threshold in the edge determination process will be explained below.

Figure 23:
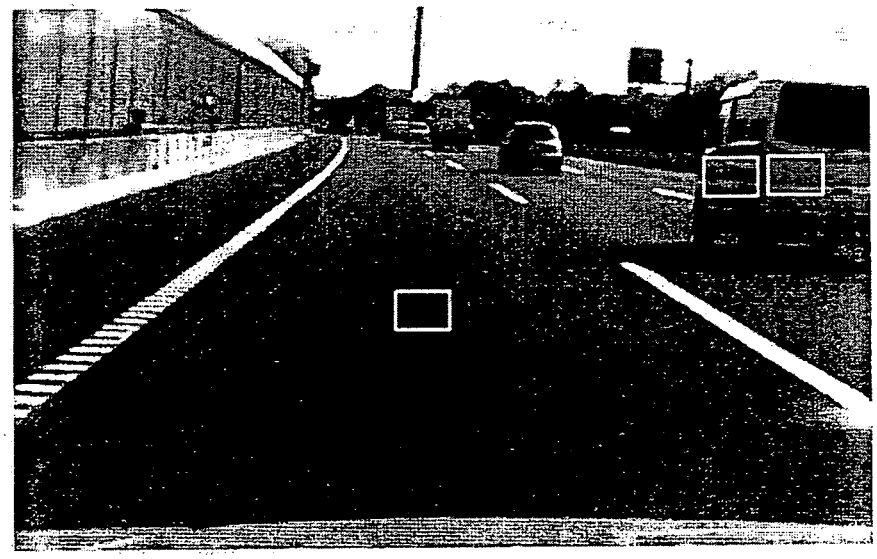
FIG. 23 is a diagram illustrating an example of the black and white image (luminance image) generated by the black and white image processing part from the raw polarization image data acquired by the polarization camera.

FIG. 23 is a diagram illustrating an example of the black and white image (luminance image) generated by the black and white image processing part 13 from the raw polarization image data acquired by the polarization camera 10.

Figure 24:
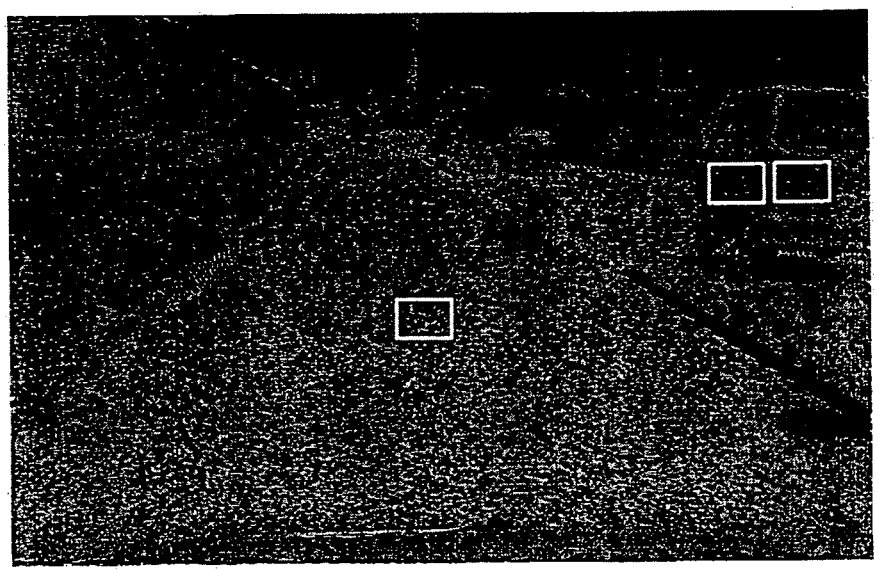
FIG. 24 is a diagram illustrating the polarized intensity difference image generated by the polarized intensity difference image processing part from the raw polarization image.

FIG. 24 is a diagram illustrating the polarized intensity difference image generated by the polarized intensity difference image processing part 15 from the raw polarization image.

Figure 25:
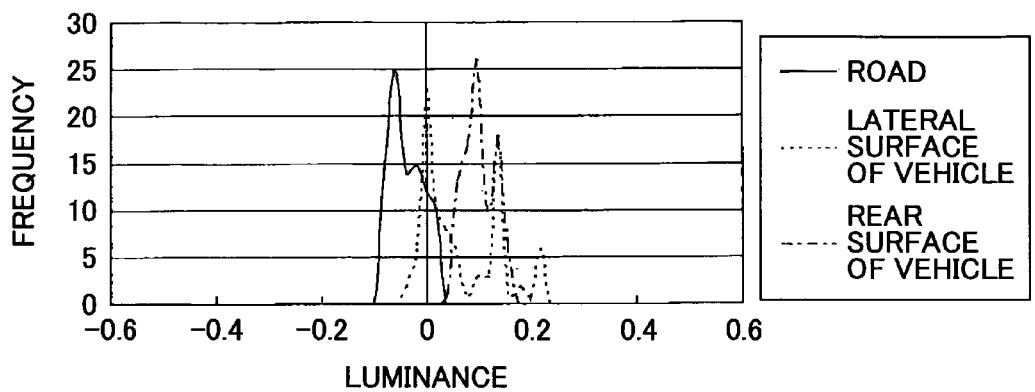
FIG. 25 is a diagram illustrating a luminance value distribution at three positions outlined by a white rectangle in FIG. 23 for 100 frames.

FIG. 25 is a diagram illustrating a luminance value distribution at three positions outlined by white rectangle in FIG. 23 for 100 frames.

Figure 26:
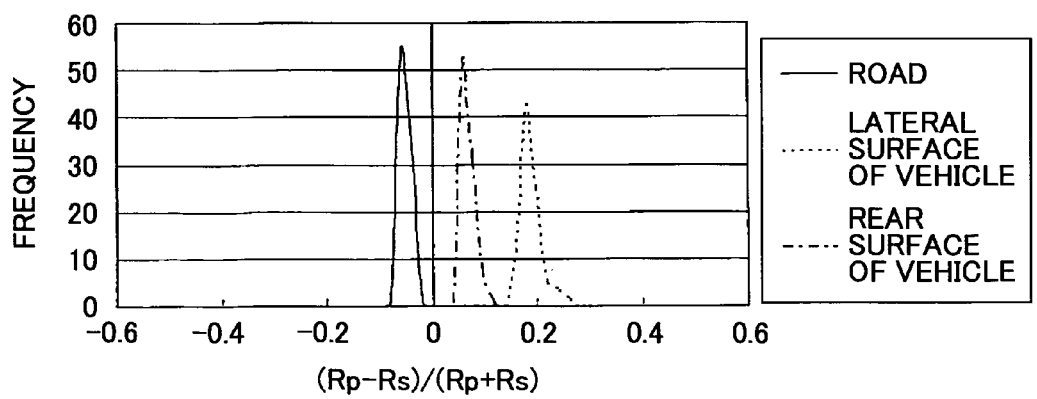
FIG. 26 is a diagram illustrating a polarized intensity difference distribution at three positions outlined by a white rectangle in FIG. 24 for 100 frames.

FIG. 26 is a diagram illustrating a polarized intensity difference distribution at three positions outlined by white rectangle in FIG. 24 for 100 frames.

As seen from the histogram illustrated in FIG. 25, luminance values are overlaid in a luminance distribution in the area of the asphalt, a luminance distribution in an area of a lateral side of another vehicle, and a luminance distribution of an area of a rear side of another vehicle. On the contrary, as seen from the histogram illustrated in FIG. 26, the polarized intensity differences are not overlaid and can be seen respectively in the luminance distribution in the area of the asphalt, the luminance distribution in an area of a lateral side of another vehicle, and the luminance distribution of an area of a rear side of another vehicle. Accordingly, by setting a proper threshold possible to divide these areas, it is possible to distinguish and determine the area of the asphalt, the area of a lateral side of another vehicle, and the luminance distribution of the area of the rear side of another vehicle, even if it is difficult to distinguish these areas by the black and white image (luminance image).

Next, a solid object identification process conducted by the solid object identifying part 18 will be explained.

Before explaining the solid object identification process, first, a reason why a solid object can be identifiable from the polarized intensity difference will be explained.

Light reflected on the road surface is taken into the polarization camera 10 at a different incidence angle from light reflected on a lateral surface of the solid object. Thus, the P-polarized intensity and the S-polarized intensity are different respectively to the road surface and lateral surface of the solid object. Especially, in a case in which a lateral surface of the solid object is approximately perpendicular to the road surface, a relative relationship between the P-polarization component and the S-polarization component included in light reflected from the lateral surface of the solid object corresponds to an inversion of that relative relationship between the P-polarization component and the S-polarization component included in light reflected from the road surface. In general, the relative relationship between the P-polarization component and the S-polarization component included in the reflected light indicates a relationship in that the S-polarization component, which is a polarization component perpendicular to an incidence plane, is greater than the P-polarization component, which is a polarization component parallel to the incidence plane. Accordingly, when the polarization camera 10 receives light reflected from the road surface or a plane parallel to the road surface, the S-polarized intensity is greater than the P-polarized intensity. When the polarization camera 10 receives light reflected from the lateral surface of the solid object approximately erect to the road surface, the P-polarization component is greater than the S-polarization component. Due to a difference of the polarization characteristic between the road surface and the solid object, by comparing strengths of the S-polarized component and the P-polarized component in the reflected light received by the polarization camera 10, it can be comprehended that the reflected light comes from the surface parallel to the road surface if the S-polarization component is greater than the P-polarization component. Also, it can be comprehended that the reflected light comes from the surface perpendicular to the road surface if the P-polarization component is stronger than the S-polarization component. As a result, by acquiring a difference value between the S-polarization component and the P-polarization component, depending on positive or negative of the difference value, it is possible to determine whether the solid object has the surface parallel to the road surface or the solid object has an outer surface facing towards a direction different than the road surface.

In the solid object identification process according to the embodiment, it is determined that the area indicates the solid object, by using the polarized intensity difference for each of areas divided by an edge, which is determined in the above-described edge determination process, as an identification index value. As described above, in the solid object identification process, it is possible to determine whether or not the area indicates the solid object, by using the difference value between the S-polarized intensity and the P-polarized intensity as the identification index value. However, if brightness is insufficient, the difference value between the S-polarized intensity and the P-polarized intensity calculated as the identification index value becomes smaller. Thus, it becomes difficult to determine whether or not the area indicates the solid object. On the contrary, in this embodiment, by using the polarized intensity difference acquired by dividing the difference value with the total value (black and white luminance) of the S-polarized intensity and the P-polarized intensity, it is possible to acquire a relatively greater value of the polarized intensity difference as the identification index value, even if brightness is insufficient.

The flow of the solid object identification process according to the embodiment will be described below. For each of areas divided by the edge determined in the above-described edge determination process, it is determined that the polarized intensity difference of the area is equal to or less than the threshold for the solid object defined beforehand (step S21). In this embodiment, as seen from the histogram illustrated in FIG. 26, the polarized intensity difference regarding the solid object is a positive value. Accordingly, in the embodiment, a positive value (for example, +0.05) in a vicinity of zero as a threshold for the solid object is applied. If an area has the polarized intensity difference being within a range equal to or greater than this threshold, the area is identified as the solid object. In the above-described road surface structure identification process, a similar process can be realized even if the relative polarized intensity difference is used. If it is determined that the polarized intensity difference is equal to or less than the threshold for the solid object, the area is distinguished from a shaded road surface and is identified as the solid object and information of the area is stored (step S22). By conducting the steps S21 and S22 for all areas (step S23), it is possible to comprehend each of areas showing the solid objects in the photographic image.

Moreover, between the upper portion and the lower portion in the photographic image, there is a difference of the strength of light reflected from an object. This difference is considered, and the threshold for the solid object to be used may be changed in the upper portion and the bottom portion in the photographic image.

Furthermore, accuracy of identifying an object in the lower portion in the photographic image capturing an object at closer position is higher than the upper portion. Thus, it is preferable to make a process order of the process lines from a bottom to an upper in the photographic image.

Next, a type specification process of the solid object conducted by the solid object specifying part 19 will be described.

First, the solid object specifying part 19 recognizes a shape of an area identified by the solid object in the above-described solid object identification process (step S24), and determines whether or not there is a shape template being approximately the same as a shape of the area (step S25). In this determination, when it is determined that there is the shape template approximating the shape of the area, it is specified that a solid object of the area is a type associated with the shape template, and information of the type is stored (step S26). For example, if the solid object is approximated to a shape template of a vehicle shape, it is specified that the solid object is another vehicle. By conducting the steps S25 and S26 for all objects (step S27), the process for specifying the solid object is terminated. It should be noted that a method for approximating and recognizing the shape in the solid object specifying part 19 is the same as the method conducted by the above-described road surface structure specifying part 17.

In order to improve accuracy of the type specification process of the solid object and the solid object identification process, a previous process result may be used similar to the above-described process for specifying the type of the road surface structure.

Also, the edge threshold used in the determination (step S3) of the edge determination process and the threshold for the solid object used in the determination (step S21) of the identifying process of the solid object may be approximately changed depending on the image pickup circumstance. For instance, these thresholds may be changed depending on a time period such as a day time, a night time, or the like, or depending on weather such as a rainy day, a fine day, or the like. This switch can be realized by using information obtained from time information, information acquired from a rain sensor, a sunshine sensor, or the like.

Moreover, in a case of attaching the polarization camera 10 according to the embodiment to a rear-view mirror or the like inside the vehicle, it is preferable to consider the polarization characteristic of the windshield glass similar to the road surface structure specification process.

A result from specifying the type of the solid object conducted by the solid object specifying part 19 can be used for various processes.

For example, based on a process result of the solid object specifying part 19, an approach of the solid object recognized as an obstacle to avoid is reported to the driver with an alarm, and an automatic braking system of the vehicle is controlled for collision avoidance or to reduce a shock of a collision.

For example, the process result of the solid object specifying part 19 may be used for the identification process of a white line edge conducted by the white line identifying part 14. In detail, since an area, in which the type of the road surface structure is specified by the process of the solid object specifying part 19, is not a white line area, this area is eliminated from a subject in the identification process of the white line edge conducted by the white line identifying part 14. Therefore, it is possible to reduce misrecognizing the road surface structure such as another vehicle or the like with the white line, and accuracy of the recognition of the white line can be improved. The identification process of the white line edge conducted by the white line identification part 14 is described above. However, in a case of conducting a process for identifying the photographic image of an object other than the white line, generally, by eliminating an area, in which the type of the solid object is specified from a subject of the identification process, it is possible to improve accuracy of the identification process.

Moreover, for example, the result of the solid object specifying part 19 can be used for the car navigation system. In detail, vehicle position information indicating a distance, an angle, and the like between the vehicle and the external road obstacles is generated from positions of the external road obstacles such as a power pole, a street lamp, a traffic sign, and the like, which are specified from the result of the solid object specifying part 19. By using the vehicle position information, a further detailed position of the vehicle is specified within a range of a vehicle position calculated by the car navigation system. Accordingly, it is possible to improve accuracy of specifying the vehicle position in the car navigation system.

Furthermore, for example, it is possible to comprehend a position and a direction of each of various solid objects with respect to the vehicle from the result of the solid object specifying part 19. Thus, the result of the solid object specifying part 19 can be used for the ECU (Electronic Control Unit).

Especially, regarding a solid object with which collision should be prevented, for example, a black and white image (front view image) generated by using luminance data calculated by the black and white image processing part is displayed at a display including a CRT (Cathode Ray Tube), a LCD (Liquid Crystal Display), or the like as an information reporting part in the vehicle. In order to report to the driver information of the solid object in the black and white image as useful information for the driver, a process may be conducted to display the black and white image in a display form for the driver to easily recognize the solid object. For example, even if it is difficult for the driver to recognize the solid object with his eyes, the driver can confirm the solid object by looking up at the front view image on the display, and prevent a collision with the solid object.

Figure 27:
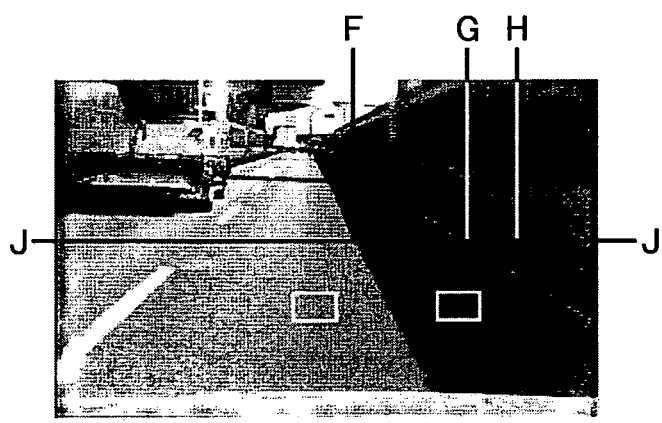
FIG. 27 is a diagram illustrating another example of the black and white image (luminance image) generated by the black and white image processing part from the raw polarization image data acquired by the polarization camera.

As described above, similar to the road surface structure identification process, in the solid object identification process according to the embodiment, it is possible to determine whether or not an area indicates the solid object, the difference value is used as the identification index value for each of the areas divided by the edge determined by the edge determination process, in which the difference value is the relative polarized intensity difference between the polarized intensity difference and the reference polarized intensity, and it can be realized to determine whether or not each of the areas indicates the solid object. However, for example, as illustrated in FIG. 27, in a case in that a sunlit portion (reference process area) at a left side from F and a shaded portion F-G exist in the asphalt area, if a portion having a greatly different luminance exists in the asphalt area, a border F on a straight line J-J between the shaded portion (lower luminance portion) F-G and the sunlit portion (greater luminance portion) at the left side from F is misrecognized as an edge in the edge determination process. Accordingly, even if the same road surface is captured, the shaded portion (shaded road surface) F-G is distinguished from the sunlit portion (sunlit road surface) at the left side from F. Regarding the shaded road surface distinguished from the sunlit road surface, there is a possibility of misrecognizing as the solid object even if it is attempted to recognize as the solid object by using the difference value between the polarized intensity difference and the reference polarized intensity, as the identification index value.

Figure 28:
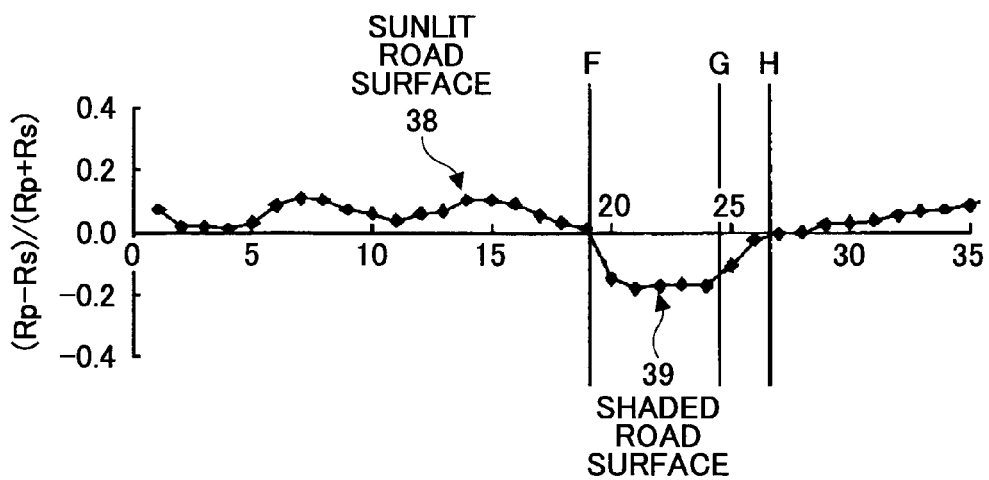
FIG. 28 is a graph illustrating the polarized intensity difference at each point on the process line (a straight line J-J extending in lateral direction) depicted in an image illustrated in FIG. 27.

FIG. 28 is a graph indicating the polarized intensity difference at each point on the process line (the straight line J-J extending in lateral direction) depicted in an image illustrated in FIG. 27.

In this graph in FIG. 28, regarding the polarized intensity differences, there is a difference between the shaded road surface F-G and a sidewall at a right side of H. Thus, by setting the relative polarized intensity difference as the identification index value, it is possible to distinguish and recognize the shaded road surface F-G and the sidewall (solid object) at the right side of H. However, according to a research of the inventors, it has been found that it is difficult to distinguish and recognize the shaded road surface and various obstacles (solid objects) including the sidewall at the road edge at higher accuracy in an actual circumstance.

On the other hand, even if it is attempted to identify the shaded road surface and the obstacles (solid objects) at the road edge by using a conventional method to identify the object in which the luminance is used as the identification index value, its accuracy is considerably lower than the process using the relative polarized intensity difference as the identification index value.

Figure 29:
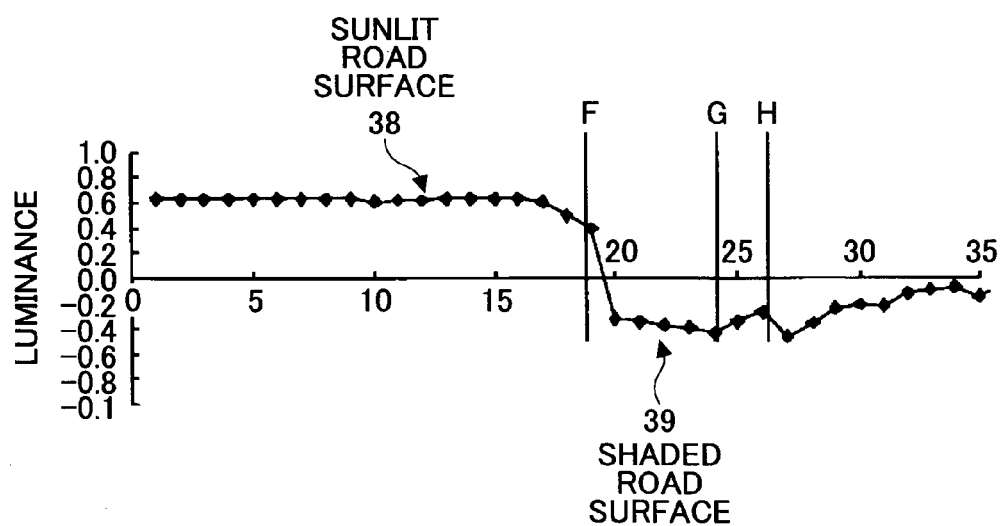
FIG. 29 is a graph illustrating the luminance (black and white luminance) at each point on the process line (the straight line J-J extending in lateral direction) depicted in an image illustrated in FIG. 27.

FIG. 29 is a graph illustrating the luminance (black and white luminance) at each point on the process line (the straight line J-J extending in lateral direction) depicted in an image illustrated in FIG. 27.

As seen from the graph in FIG. 29, there is no difference between the shaded road surface and the sidewall (solid object) in the black and white luminance. Thus, in a case of setting the black and white luminance as the identification index value, it is difficult to identify a border between the shaded road surface and the sidewall even which can be identified by using the polarized intensity difference.

Moreover, in FIG. 29, the luminance is presented by values which are normalized in a range from −1 to +1 in response to a notation of the polarized intensity difference. In detail, for example, in a case of presenting a value of the black and white luminance by a gradation from 1 to 256, level 1 (black) in the gradation corresponds to a level −1 in the luminance in FIG. 29 and a level 256 (white) in the gradation corresponds to a level +1 in the luminance in FIG. 29.

Figure 30:
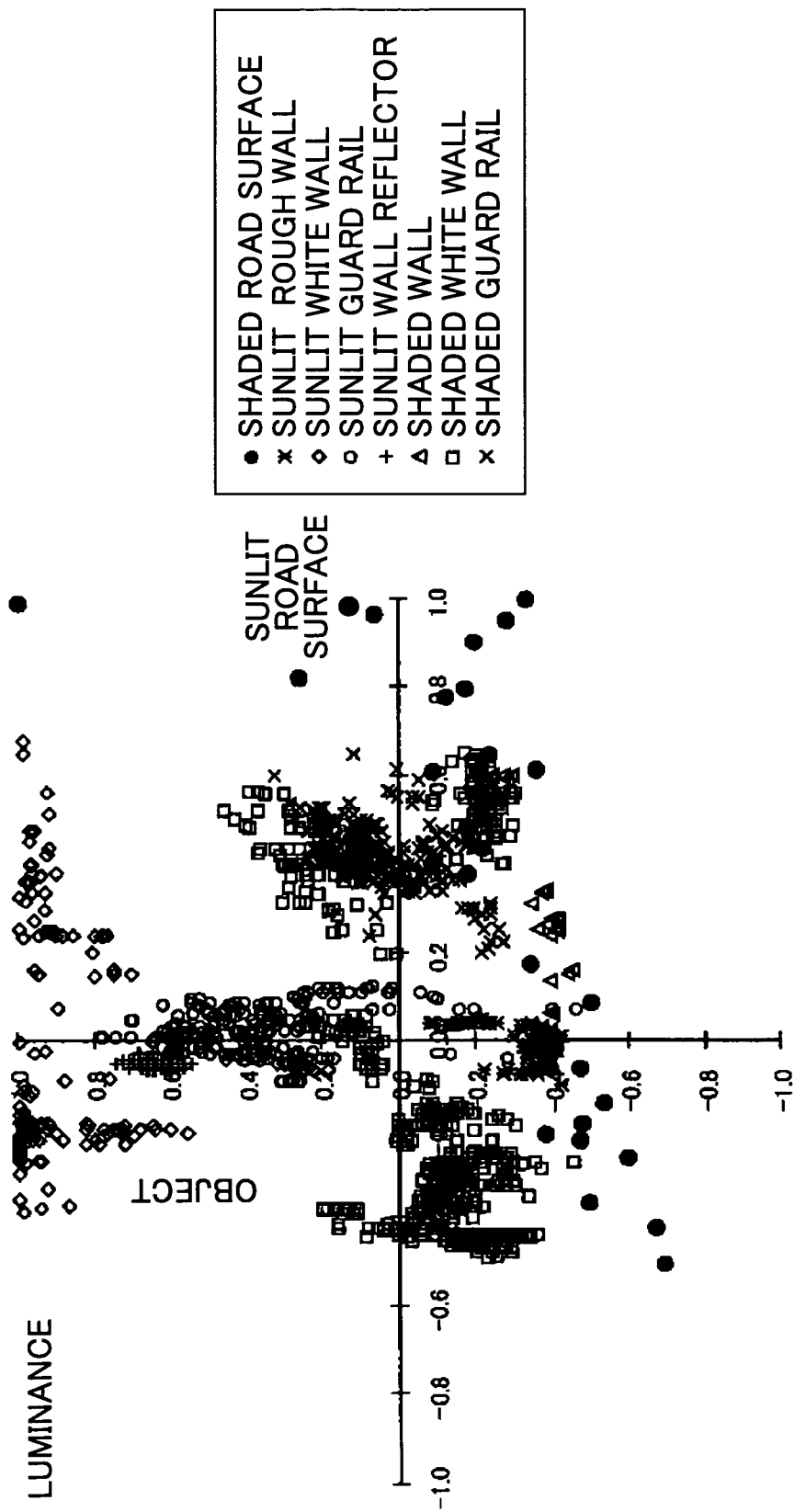
FIG. 30 is a diagram illustrating two-dimensional distribution plotting the luminance of each of types of objects to identify other than the sunlit road surface.

FIG. 30 is a diagram illustrating a two-dimensional distribution plotting the luminance of each of types of objects to identify other than the sunlit road surface. In FIG. 30, an x-axis indicates the luminance of the sunlit road surface and a y-axis indicates the luminance of each of types of the objects other than the sunlit road surface.

The objects to identify are the shaded road surface (a white rectangle portion at a right side in FIG. 27) existing on the same road surface as the sunlit road surface (a white rectangle portion at a left side in FIG. 27), and the sunlit portion and the shaded portion of the obstacles (solid objects) at the road edge. In detail, the obstacles at the road edge are a rough wall, a white wall, a guard rail, a wall reflector, and the like. In FIG. 30, black dots indicate data of the shaded road surface, and dots other than the black dots indicate data including the sunlit portion and the shaded portion of each of types of the obstacles at the road edge as described above.

As seen from the two-dimensional distribution illustrated in FIG. 30, in a range equal to or less than 0.6 which can be acquired for the luminance of the sunlit road surface in the actual circumference, a distribution area of the shaded road surface indicated by the black dots and a distribution area of the obstacles at the road edge indicated by other dots are overlapped with each other. Thus, if only luminance data are used, a threshold cannot be set to distinguish the shaded road surface and the obstacles at the road edge. The shaded road surface and the obstacles at the road edge cannot be identified, respectively.

Consequentially, in the embodiment, by using the black and white luminance, which is conventionally used alone as the identification index value, in addition to the relative polarized intensity difference, it is possible to distinguish and identify the shaded road surface having a luminance different from the sunlit road surface and the obstacles (solid objects) at the road edge, at higher accuracy.

Figure 31:
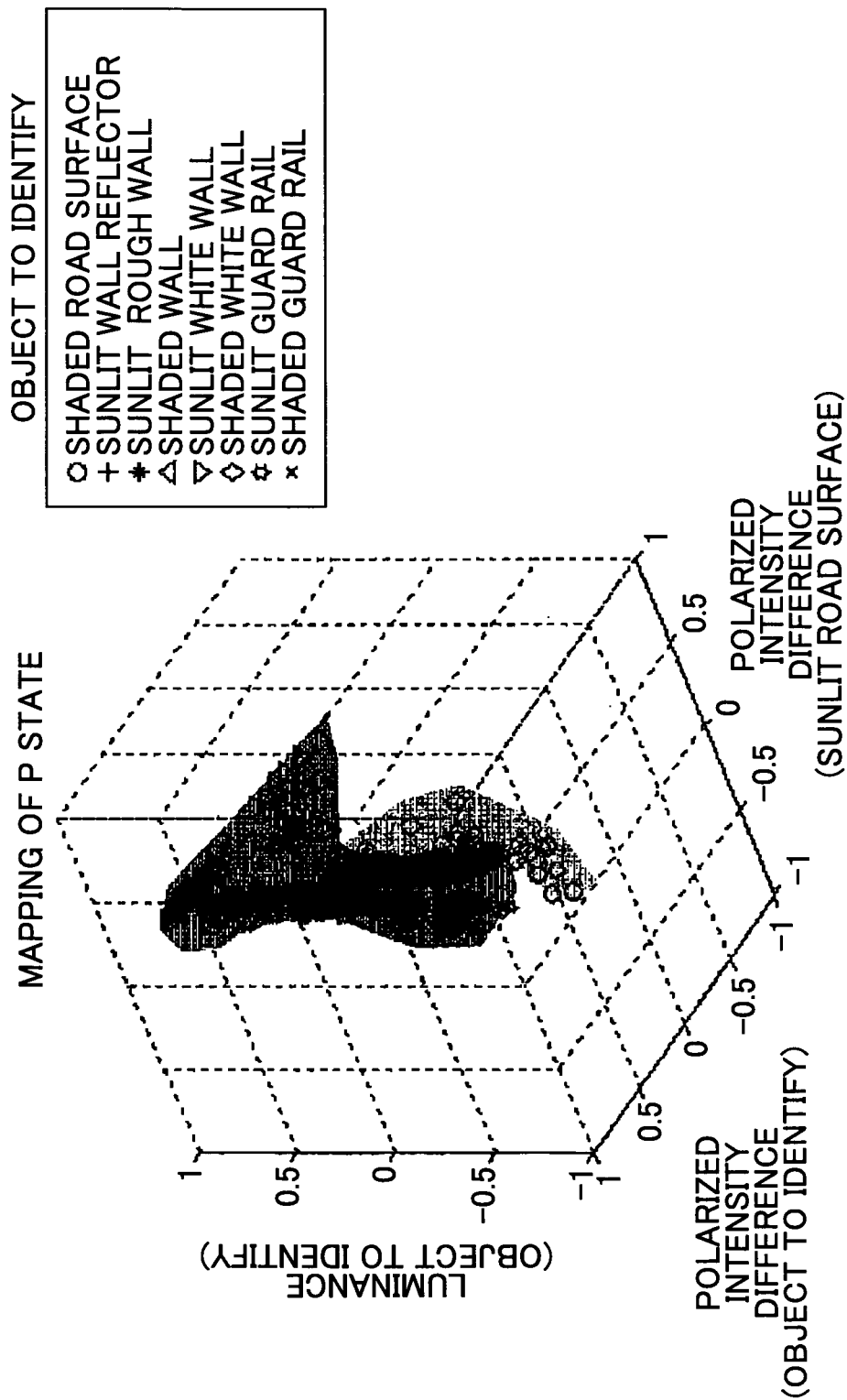
FIG. 31 is a diagram illustrating a three-dimensional distribution of each of types of objects to identify other than the sunlit road surface.

FIG. 31 is a diagram illustrating a three-dimensional distribution of each of types of objects to identify other than the sunlit road surface. In FIG. 31, an x-axis indicates the polarized intensity difference of the sunlit road surface, a y-axis indicates the polarized intensity difference of the objects other than the sunlit road surface, and an z-axis indicates the luminance of the objects to identify.

As seen from the three-dimensional distribution, in a range which can be acquired for the luminance of the sunlit road surface in the actual circumference, it can be confirmed that a distribution area of the shaded road surface indicated by the black dots and a distribution area of the obstacles at the road edge indicated by other dots are divided without being overlapped with each other. Accordingly, by using a threshold defining a border surface dividing these distribution areas, it is possible to distinguish and identify the obstacles at the road edge separately from the shaded road surface. In order to separate data, a well-know technology such as a SVM (Support Vector Machine) may be used.

Figure 32:
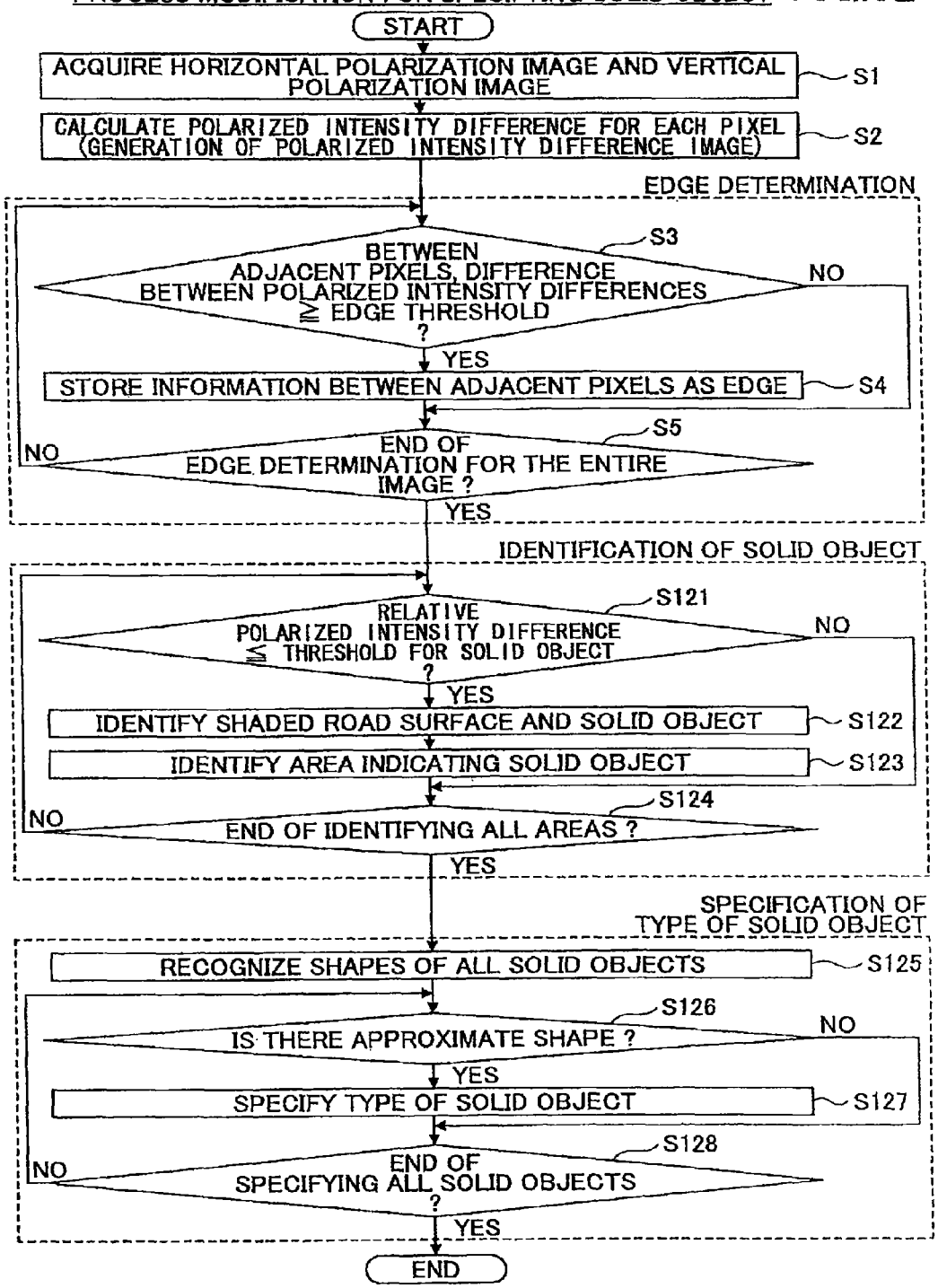
FIG. 32 is a flowchart for explaining a flow of a process modification for specifying a solid object.

Next, a flow of a process modification for specifying the solid object according to the embodiment will be described with reference to FIG. 32. FIG. 32 is a diagram for explaining the process modification for specifying the solid object according to the embodiment. First, for each of areas divided by an edge determined by the edge determination process, it is determined whether or not the relative polarized intensity difference is equal to or less than a threshold for the solid object being defined beforehand (step S121). In the embodiment, as seen from the histogram illustrated in FIG. 26, the polarized intensity difference regarding the solid object is a positive value. Also, the polarized intensity difference regarding the asphalt area, which is used as the reference polarized intensity difference, is in vicinity of −0.05. Thus, in the embodiment, the positive value (for example, +0.08) in vicinity of zero is applied as the threshold for the solid object, and an area, which indicates the relative polarized intensity difference belonging to in a range equal to or more than the threshold, is identified as the solid object.

However, in areas determined as the solid objects, the shaded road surface may be included as described above. Thus, in the embodiment, by using a threshold (for excluding the shaded road surface), which defines the border surface possible to divide one distribution area of the shaded road surface and another distribution area of the obstacles at the road edge in the three-dimensional distribution illustrated in FIG. 31, a process is conducted to exclude an area in which is misrecognized as the solid object but is the shaded road surface (step S122). After excluding the area of the shaded road surface, residual areas are identified as the solid objects and information of the residual areas is stored (step S123). By conducting the above-described steps S121 through S123 (step S124), it is possible to comprehend the area displaying the solid object in the image pickup area.

Moreover, there is a difference in an intensity of light reflected from the object between the upper portion and the lower portion in the photographic image. In consideration of this difference, the threshold for the solid object and the threshold for excluding the shaded road surface may be changed in each of the upper portion and the lower portion in the photographic image.

Furthermore, in the photographic image capturing the object being closely positioned, the lower portion has higher accuracy of object identification than the upper portion. Thus, it is preferable to make a process order of the process lines from a bottom to an upper in the photographic image.

Next, a type specification process conducted by the solid object specifying part 19 in the process modification will be described.

First, the solid object specifying part 19 recognizes a shape in the area identified as the solid object by the above-described solid object identification process (step S125), and determines whether or not there is a shape template being approximately the same shape as the area (step S126). In this determination, when it is determined that there is the shape template approximating the shape of the area, it is specified that a solid object of the area is a type associated with the shape template, and information of the type is stored (step S127). For example, if the solid object is approximated to a shape template of a vehicle shape, it is specified that the solid object is another vehicle. By conducting the steps S126 and S127 for all objects (step S128), the process for specifying the solid object is terminated. It should be noted that a method for approximating and recognizing the shape in the solid object specifying part 19 is the same as the method conducted by the above-described road surface structure specifying part 17.

In order to improve accuracy of the type specification process of the solid object and the solid object identification process, a previous process result may be used similar to the above-described process for specifying the type of the road surface structure.

Also, the edge threshold used in the determination (step S3) of the edge determination process and the threshold for the solid object used in the determination (steps S121) of the identifying process of the solid object may be approximately changed depending on the image pickup circumstance. For instance, these thresholds may be changed depending on a time period such as a day time, a night time, or the like, or depending on weather such as a rainy day, a fine day, or the like. This switch can be realized by using information obtained from time information, information acquired from a rain sensor, a sunshine sensor, or the like.

Moreover, in a case of attaching the polarization camera 10 according to the embodiment to a rear-view mirror or the like inside the vehicle, it is preferable to consider the polarization characteristic of the windshield glass similar to the road surface structure specification process.

In the embodiment, the threshold for excluding the shaded road surface defines the border surface in the three-dimensional distribution in FIG. 31. The threshold may define the border surface in a higher dimensional distribution such as a four-dimensional or five-dimensional distribution, by adding a parameter to obtain a highly precise identification capability. For example, a sun direction can be used as the parameter. In this case, direction information of the sun can be acquired by extracting information concerning a sun direction and a vehicle movement direction from a navigation system. It is possible to comprehend a direction in which a shadow is formed for the obstacle (solid object) at the road edge based on the information of the sun direction. Thus, it is possible to improve the identification capability. Alternatively, altitude information of the sun may be additionally used as the parameter. Similarly, the altitude information of the sun can be obtained by extracting information concerning a date and time of driving the vehicle through the navigation system. Also, information from a sunshine sensor used for an auto light may be additionally used.

A specification result of the type of the solid object by the solid object specifying part 19 can be used for various processes.

For example, based on a process result of the solid object specifying part 19, an approach of the solid object recognized as an obstacle to avoid is reported to the driver with an alarm, and an automatic braking system of the vehicle is controlled for collision avoidance or to reduce a shock of a collision.

For example, the process result of the solid object specifying part 19 may be used for the identification process of a white line edge conducted by the white line identifying part 14. In detail, since an area, in which the type of the solid object is specified by the process of the solid object specifying part 19, is not a white line area, this area is eliminated from a subject in the identification process of the white line edge conducted by the white line identifying part 14. Therefore, it is possible to reduce misrecognizing the solid object such as another vehicle or the like with the white line, and accuracy of the recognition of the white line can be improved. The identification process of the white line edge conducted by the white line identification part 14 is described above. However, in a case of conducting a process for identifying the photographic image of an object other than the white line, generally, by eliminating an area, in which the type of the solid object is specified from a subject of the identification process, it is possible to improve accuracy of the identification process.

Moreover, for example, the result of the solid object specifying part 19 can be used for the car navigation system. In detail, vehicle position information indicating a distance, an angle, and the like between the vehicle and the external road obstacles is generated from positions of the external road obstacles such as a power pole, a street lamp, a traffic sign, and the like, which are specified from the result of the solid object specifying part 19. By using the vehicle position information, a further detailed position of the vehicle is specified within a range of a vehicle position calculated by the car navigation system. Accordingly, it is possible to improve accuracy of specifying the vehicle position in the car navigation system.

Furthermore, for example, it is possible to comprehend a position and a direction of each of various solid objects with respect to the vehicle from the result of the solid object specifying part 19. Thus, the result of the solid object specifying part 19 can be used for the ECU (Electronic Control Unit).

Especially, regarding a solid object with which collision should be prevented, for example, a black and white image (front view image) generated by using luminance data calculated by the black and white image processing part is displayed at a display including a CRT (Cathode Ray Tube), a LCD (Liquid Crystal Display), or the like as an information reporting part in the vehicle. In order to report to the driver information of the solid object in the black and white image as useful information for the driver, a process may be conducted to display the black and white image in a display form for the driver to easily recognize the solid object. For example, even if it is difficult for the driver to recognize the solid object with his eyes, the driver can confirm the solid object by looking up at the front view image on the display, and prevent a collision with the solid object.

In a first aspect of the present invention, the object identifying apparatus, the moving body control apparatus including the object identifying apparatus, and the information providing apparatus including the object identifying apparatus are presented to increase the number of the types of the features of the object which can be used to identify the object, and to conclusively increase the number of the types of the objects which can be specified.

As described above, the object identifying apparatus according to the embodiment includes the polarization camera 10, the polarized intensity difference image processing part 15, the road surface structure identifying part 16, and the solid object identifying part 18. The polarization camera 10 as the imaging part receives two types of polarized light (P-polarization and S-polarization) having a different polarization direction included in the reflected light from the object existing in the image pickup area, and captures respective polarization images (P-polarization image and S-polarization image). The polarized intensity difference image processing part 15 as the luminance difference calculating part divides each of the P-polarization image and the S-polarization image captured by the polarization camera 10 into predetermined process areas (by one pixel unit), and calculates a luminance difference value between the P-polarization image and the S-polarization image for each pixel. Each of the road surface structure identifying part 16 and the solid object identifying part 18 as the object identifying part conducts the process for identifying the object existing in a location corresponding to each of pixels in the image pickup area by using the polarized intensity difference being the identification index value acquired from the luminance difference value calculated by the polarized intensity difference image processing part 15.

Therefore, it is possible to distinguish and recognize between the road surface and the road surface structure or between the road surface and the solid object, which could not be distinguished by a difference of the black and white luminance.

Moreover, each of the road surface structure identifying part 16 and the solid object identifying part 18 conducts the determination process for determining which one of multiple numerical ranges the polarized intensity difference belongs to, in which the multiple numerical ranges are defined for each of multiple different objects, and conducts the identification process for identifying that the object existing at a location respective to the process area is an object corresponding to the one numerical range determined in the determination process.

Furthermore, in the embodiment, the polarization camera 10 is equipped with the vehicle being a moving body which drives on the road surface, and captures an image of the image pickup area including the road surface from an obliquely upper direction with respect to the road surface. The numerical value range defined for the same object is set for at least more than two segmentations segmenting into the upper direction and the lower direction for each of the P-polarization image and the S-polarization image. In the identification process, multiple numerical value ranges are set for each of the two segmentations, and it is determined which one of the multiple numerical value ranges for one segmentation the polarized intensity difference of the process area in the one segmentation belongs to. Accordingly, it is possible to properly identify the object in consideration of an amount of light received by the polarization camera 10 in the upper direction and the lower direction for each of the P-polarization image and the S-polarization image.

Also, in the embodiment, the road surface structure identifying part 16 conducts the process for identifying a material (metal) of the object existing at the location corresponding to each of the process areas in the image pickup area. Even if objects made of a different material in the same plane cannot be distinguished in a case of using the difference of the black and white luminance between the objects, each of the objects can be appropriately indentified in the embodiment.

In addition, in the embodiment, the polarization camera 10 is equipped with the vehicle being the moving body driving on the road surface, which is a surface for the moving body to move, captures an image of the image pickup area including the road surface, and conducts the process for identifying the object (road surface structure) which outer surface is exposed on substantially flush with the road surface. Accordingly, it is possible to identify the road surface structure such as the manhole cover, the road connection portion, dividing line formed by Botts' Dots or cats' eyes, or the like.

Moreover, in the embodiment, the road surface structure identifying part 16 sets the polarized intensity difference calculated by the polarized intensity difference image processing part 15 to be a reference index value for a reference process area corresponding to a location of the asphalt being a reference object which is assumed beforehand to exist in the image pickup area, and calculates a relative value (relative polarized intensity difference) with respect to the reference index value calculated by the polarized intensity difference image processing part 15 for each of the process areas different from the reference process area. The road surface structure identifying part 16 conducts the process for identifying the object existing at a location corresponding to the process area, based on the relative polarized intensity difference. Therefore, even if a deviance occurs to a calculation value of the polarized intensity difference of a subject area due to influences such as a difference of a circumstance and the like, these influences can be reduced by using the relative amount with respect to the reference polarized intensity difference in which the difference is caused due to the same influences.

Furthermore, in the embodiment, the polarized intensity difference indicating a ratio of a luminance difference value (P-polarized intensity−S-polarized intensity) to a total luminance value (P-polarized intensity+S-polarized intensity) is used as the identification index value, it is possible to recognize the object at higher accuracy even if brightness is insufficient.

Also, in the embodiment, in each of the road surface structure identifying part 16 and the solid object identifying part 18, a result of the identification process is stored in a memory being an identification process result storing part which stores results of the identification processes previously conducted, and the identification process is conducted by using the results of the previous identification processes which are stored in the memory. Thus, it is possible to determine reliability of an identification result depending on whether the same result as a previous identification result is acquired.

In addition, in the embodiment, the shape memory part 20 is included as the shape information storage part for storing the shape template which is shape information indicating a shape of a predetermined specific object captured by the polarization camera 10. In the identification process, each of the road surface structure identifying part 16 and the solid object identifying part 18 identifies one object (the road surface structure or the solid object) formed by multiple adjacent pixels. Each of the road surface structure specifying part 17 and the solid object specifying part 19 determines whether or not the shape of the one object is approximate to the shape indicated by the shape template stored in the shape memory part 20. When it is determined that the shape of the one object is approximate to the shape indicated by the shape template, in the process for specifying the object, the one object at a location respective to the multiple pixels is specified as the specific object corresponding to the shape template. Therefore, the one object can be specified by using not only the polarization characteristic but also shape information of the one object.

Moreover, as described above, the object identifying apparatus according to the embodiment can be applied to the automatic braking system as a moving body control apparatus including the ECU which is a movement control part for controlling a movement of the vehicle being the moving body, by using the identification result of the object identifying apparatus.

Furthermore, as described above, the object identifying apparatus according to the embodiment can be applied to the information providing apparatus which generates the useful information for the driver operating the vehicle being the moving body by using the identification result of the object identifying apparatus, and report to the driver the generated information.

It should be noted that the entire driver assistance system according to the embodiment is not always required to be equipped with the vehicle. For example, only the polarization camera 10 is equipped with the vehicle, and other system components may be arranged at another remote place from the vehicle. In this case, the system can be made for a person other than the driver to objectively comprehend a driving state of the vehicle.

Moreover, in the embodiment, the polarized intensity difference is used as an identification index value. Alternatively, the luminance difference value between the P-polarization image and the S-polarization image may be used.

According to the present invention, for example, regarding two polarization images captured by the imaging part, the luminance difference value between two polarization images is calculated for each of the predetermined process areas, and the identification process is conducted for an object existing at a location corresponding to each of the process areas by using the identification index value acquired from the luminance difference value. In general, light reflected from the same place which is illuminated by natural light and an illumination lamp includes multiple polarized lights having a different polarization direction. Even a luminous intensity and an incident angle of light illuminated to the same place are the same, an intensity in each of the polarization directions of these multiple polarized lights is different when the polarization characteristic of each object at the place is different. The inventors focus attention on this feature of the polarized light. As a result of their dedicated research, they have achieved to identify the object from a different polarization characteristic of the object. For example, it has been found that the object can be identified by using a fact that the different polarization characteristic of the object greatly influences the luminance difference value between two polarization images acquired by receiving two polarized lights having a different polarization direction. Accordingly, by using the identification index value (including the luminance difference value itself) acquired from the luminance difference value between the two polarization images, it is possible to distinguish objects having the different polarization characteristic and identify each of the objects at higher accuracy.

As described above, according to the first aspect of the present invention, since the object can be identified by using anew feature which is the polarization characteristic of the object and can be acquired by the imaging part, it is possible to increase the number of types of features of the object which can be used to identify the object. Therefore, excellent effect can be obtained in that the number of types of objects to be specified.

In a second aspect of the present invention, the solid object identifying apparatus, the moving body control apparatus including the solid object identifying apparatus, and the information providing apparatus including the solid object identifying apparatus are presented to identify, at higher accuracy, the border between the solid object and the plane object in which there is no explicit difference between their luminance in the image pickup area, by using the imaging part.

As described above, the solid object identifying apparatus identifies a solid object, which exists in the image pickup area and has an outer surface facing towards a different direction than a predetermined plane (road surface), and includes the polarization camera 10, the polarized intensity difference image processing part 15, and the solid object identifying part 18. The polarization camera 10 receives two polarized lights having a different polarization direction included in light reflected from an object existing in the image pickup area. As the luminance difference calculating part, the polarized intensity difference image processing part 15 divides each of the P-polarization image and the S-polarization image captured by the polarization camera 10 into the predetermine process areas (by one pixel unit), and calculates the luminance difference value between the P-polarization image and the S-polarization image for each pixel. As the object identification processing part, the solid object identifying part 18 conducts the solid object identification process for identifying whether or not the object existing at the place corresponding to each of pixels in the image pickup area, by using the polarized intensity difference being the identification index value which is acquired from the luminance difference value calculated by the polarized intensity difference image processing part 15. Accordingly, it is possible to distinguish and identify the border between the road surface and the solid object which are not identified in a case of using the difference between their black and white luminance.

Moreover, in the embodiment, the solid object identifying part 18 conducts the determination process for determining which one of multiple numerical ranges the polarized intensity difference belongs to, in which the multiple numerical ranges are defined for each of the plane object (asphalt) and the solid object existing on the same plane as the road surface, and conducts a process for identifying that the object existing at the place corresponding to the process area is an object corresponding to the one numerical range determined in the determination process, so as to perform the object identification process. Therefore, the solid object identification process can be realized by the processes simply comparing with respective thresholds.

The polarization camera 10 is configured similar to the first aspect. Also, the solid object identifying part 18 is configured similar to the first aspect.

Moreover, as described above, the solid object identifying apparatus according to the embodiment can be applied to the automatic braking system as a moving body control apparatus including the ECU which is a movement control part for controlling a movement of the vehicle being the moving body, by using the identification result of the solid object identifying apparatus.

Furthermore, as described above, the solid object identifying apparatus according to the embodiment can be applied to the information providing apparatus which generates the useful information for the driver operating the vehicle being the moving body by using the identification result of the solid object identifying apparatus, and reports to the driver the generated information.

According to the present invention, for example, regarding two polarization images captured by the imaging part, the luminance difference value between two polarization images is calculated for each of the predetermined process areas, and the identification process is conducted for an object existing at a location corresponding to each of the process areas by using the identification index value acquired from the luminance difference value. In general, light reflected from the same place which is illuminated by natural light and an illumination lamp includes multiple polarized lights having a different polarization direction. Regarding the multiple polarized lights, a polarization component included in the reflected light changes depending on a direction of a reflected surface (incidence surface). The inventors focus attention on this feature of the polarized light. As a result of their dedicated research, they have found out that it is possible to identify the solid object based on the direction which a surface of the object reflecting light faces to. For example, the direction to which the surface of the object reflecting light strongly influences the luminance difference value between two polarization images acquired by receiving two polarized lights having a different polarization direction. By utilizing this feature, the solid object can be identified. Thus, it is possible to distinguish and identify the solid object which is the object reflecting light from the plane object at higher accuracy, by using the identification index value (including the luminous difference value) acquired from the polarized intensity difference value between the two polarization images acquired from the reflected light.

As described above, according to the second aspect of the present invention, there is an excellent effect in that it is possible to identify the border between the solid object and the plane object in which there is no explicit difference between their luminance in the image pickup area, by using the identification index value acquired from the luminance difference value between two polarization images acquired by the imaging part.

It should be noted that the entire driver assistance system according to the embodiment is not always required to be equipped with the vehicle. For example, only the polarization camera 10 is equipped with the vehicle, and other system components may be arranged at another remote place from the vehicle. In this case, the system can be made for a person other than the driver to objectively comprehend a driving state of the vehicle.

Moreover, in the embodiment, the polarized intensity difference is used as an identification index value. Alternatively, the luminance difference value between the P-polarization image and the S-polarization image may be used.

In a third aspect of the present invention, the solid object identifying apparatus, the moving body control apparatus including the solid object identifying apparatus, and the information providing apparatus including the solid object identifying apparatus are presented to identify, at higher accuracy, the border between the solid object and the plane object by using the imaging part, even in a case in that there is a portion having a greatly different luminance in the same plane object.

As described above, the solid object identifying apparatus identifies a solid object, which exists in the image pickup area and has an outer surface facing towards a different direction than a predetermined plane (road surface), and includes the polarization camera 10, the black and white image processing part 13, the polarized intensity difference image processing part 15, and the solid object identifying part 18. As the imaging part, the polarization camera 10 receives two polarized lights having a different polarization direction included in light reflected from an object existing in the image pickup area. As the luminance calculating part, the black and white image processing part 13 divides each of the P-polarization image and the S-polarization image captured by the polarization camera 10 into the predetermine process areas (by one pixel unit), and calculates the black and white luminance which the total luminance value between the P-polarization image and the S-polarization image for each pixel. As the polarized intensity difference calculating part, the polarized intensity difference image processing part 15 calculates the polarized intensity difference indicating a ratio of the luminance difference value between the P-polarization image and the S-polarization image with respect to the black and white luminance. The reference plane object (asphalt) is assumed beforehand to exist in the same plane as the predetermined plane. For the reference process area (area corresponding to sunlit road surface), which is a portion in which the luminance is relatively greater in process areas corresponding to the place where the reference plane object (asphalt) exist, the polarized intensity difference image processing part 15 calculates the polarized intensity difference. Also, as the relative polarized intensity difference part, the polarized intensity difference image processing part 15 sets the calculated polarized intensity difference to be the reference polarized intensity difference, and calculates the relative polarized intensity difference which is a difference value between the polarized intensity difference calculated by the polarized intensity difference image processing part 15 for each process area other than the reference process area and the reference polarized intensity difference. As the object identification processing part, the solid object identifying part 18 uses the black and white luminance calculated by the black and white image processing part 13 and the relative polarized intensity difference calculated by the polarized intensity difference image processing part 15, as the identification index value, and conducts the solid object identification process for identifying whether or not the object existing at the place corresponding to each of pixels in the image pickup area is the solid object. Accordingly, it is possible to distinguish and identify the border between the shaded road surface and the solid object at higher accuracy.

Moreover, the solid object identifying part 18 conducts the determination process for determining which one of multiple numerical ranges the identification index value belong to. The multiple numerical ranges are defined for each of the shaded road surface and the solid object. The shaded road surface exists at the place corresponding to a lower luminance process area (area corresponding to the shaded road surface), which is a portion having a lower luminance in the process area corresponding to the place where the asphalt (road surface) exists. Consecutively, the solid object identifying part 18 conducts the process for identifying the object existing at the place corresponding to the process area to be the object corresponding to the one numerical range determined in the determination process in which the identification index value belongs to the one numerical range, so as to perform the solid object identification process. Therefore, the solid object identification process can be realized by the processes simply comparing with respective thresholds.

The polarization camera 10 is configured similar to the first aspect.

Also, in the embodiment, results of the identification processes previously conducted by the solid object identifying part 18 are stored in a memory being an identification process result storing part which stores results of the identification processes previously conducted. The solid object identifying part 18 conducts the identification process by using not only the results of the previous identification processes which are stored in the memory but also the identification index value.

Moreover, as described above, the solid object identifying apparatus according to the embodiment can be applied to the automatic braking system as a moving body control apparatus including the ECU which is a movement control part for controlling a movement of the vehicle being the moving body, by using the identification result of the solid object identifying apparatus.

Furthermore, as described above, the solid object identifying apparatus according to the embodiment can be applied to the information providing apparatus which generates the useful information for the driver operating the vehicle being the moving body by using the identification result of the solid object identifying apparatus, and reports to the driver the generated information.

It should be noted that the entire driver assistance system according to the embodiment is not always required to be equipped with the vehicle. For example, only the polarization camera 10 is equipped with the vehicle, and other system components may be arranged at another remote place from the vehicle. In this case, the system can be made for a person other than the driver to objectively comprehend a driving state of the vehicle.

As a result of a dedicated research, the inventors have found out the solid object identification method which is innovative as described above, to distinguish and identify the solid object existing at the place corresponding to each of the process areas to be the plane object at higher accuracy, by using the polarized intensity difference as the identification index value which indicates the ratio of the luminance difference to the total luminance value between two polarization images captured by the imaging part. For example, in the solid object identification method, a difference (relative polarized intensity difference) between the reference process area and an identification object process area is used as the identification index value. The solid object identification method can distinguish and identify the solid object which exists at the place corresponding to each of process areas and is the plane object with higher accuracy than the conventional method using the luminance as the identification index value. However, even if the polarized intensity difference is used, in a case in which there is a portion where the luminance is greatly different in the plane object in which the reference process area exists, the process area, in which the plane object having the polarized intensity different from that of the reference process area may be misrecognized as the solid object.

As a result of further research, the inventors have found out that it is possible to distinguish and identify one process area having the polarized intensity different from the reference process area and another process area in which the solid object exists, by using both the polarized intensity difference and the luminance which is used as the identification index value in the conventional method.

Even in a case in which since the portion has the polarized intensity being greatly different in the same plane object and the polarized intensity is different from the reference process area, the plane object is likely to be misrecognized as the solid object, according to the embodiment using both the polarized intensity difference and the luminance, it is possible to identify the border between the solid object and the plane object of a process area portion, at higher accuracy. In addition, according to the embodiment, the total polarized intensity value of two polarization images captured by the imaging part, which is used to calculate the polarized intensity difference, is used for the luminance used as the identification index value. Therefore, a new detecting device is not required.

As described above, according to the embodiment, even if the portion having the polarized intensity being greatly different in the same plane object, it is possible to identify the solid object from the plane object at higher accuracy by using the imaging part.

The present invention is not limited to the specifically disclosed embodiments, and variations and modifications may be made without departing from the scope of the invention.

The present application is based on Japanese Priority Applications No. 2009-295885 filed on Dec. 25, 2009, No. 2009-295902 filed on Dec. 25, 2009, No. 2009-295963 filed on Dec. 25, 2009, No. 2010-243925 filed on Oct. 29, 2010, No. 2010-243951 filed on Oct. 29, 2010, and No. 2010-243989 filed on Oct. 29, 2010, the entire contents of which are hereby incorporated by reference.

The invention claimed is:

1. A solid object identifying apparatus for identifying a solid object existing in an image pickup area having an outer surface facing towards a different direction than a predetermined plane, said solid object identifying apparatus comprising:
   an imaging part configured to receive two polarized lights having a different polarization direction included in light reflected from an object existing in the image pickup area and to capture two polarization images;
   a luminance calculating part configured to divide each of the two polarization images captured by the imaging part into predetermined pixels, and to calculate a total luminance value in the two polarization images for each of the predetermined pixels;
   a polarized intensity difference calculating part configured to calculate a polarized intensity difference indicating a ratio of a polarized intensity difference value between the two polarization images to the total luminance value, for each of the predetermined pixels;
   a relative polarized intensity difference calculating part configured to set the polarized intensity difference calculated by the polarized intensity difference calculating part to be a reference polarized intensity difference in a reference pixel of which a luminance is relatively greater in a pixel corresponding to a reference plane object assumed beforehand to be in a same plane as the predetermined plane, and to calculate a relative difference value between the reference polarized intensity difference and the polarized intensity difference which is calculated by the polarized intensity difference calculating part for a different pixel from the reference pixel; and
   a solid object identification processing part configured to:
      conduct a solid object identification process for identifying whether or not an object existing at a place corresponding to each of the predetermined pixels in the image pickup area is the solid object, by using the total luminance value calculated by the luminance calculating part and the relative difference value calculated by the relative polarized intensity difference calculating part, as an identification index value, and
      conduct a determination process for determining which one of multiple numerical ranges the identification index value belongs to, in which the multiple numerical ranges are defined for each solid objects and a lower luminance portion of the reference plane object existing at a place corresponding to a lower luminance pixel indicating lower luminance in a pixel in which the reference plane object exist, and to conduct a process for identifying an object corresponding to the one of the multiple numerical ranges which is determined in the determination process, so as to conduct the solid object identification process.

2. The solid object identifying apparatus according to claim 1, wherein the imaging part is configured to be equipped with a moving body which moves on a movement surface and to capture the image pickup area including the movement surface from an obliquely upper direction with respect to the movement surface.

3. The solid object identifying apparatus according to claim 1, wherein the solid object identification process is configured to include a material identification process for identifying a material of the object existing at the place corresponding to each of the predetermined pixels in the image pickup area.

4. The solid object identifying apparatus according to claim 3, wherein the material of the object identified by the material identification process includes metal.

5. The solid object identifying apparatus according to claim 1, wherein the imaging part is equipped with a vehicle being a moving body which moves on a road surface being a movement surface.

6. The solid object identifying apparatus according to claim 5, wherein said solid object identification processing part is configured to conduct the solid object identification process for identifying the object of which an outer surface is exposed flush with the road surface.

7. The solid object identifying apparatus according to claim 1, wherein the solid object identification processing part is configured to set the identification index value to be a reference index value.

8. The solid object identifying apparatus according to claim 7, wherein the solid object identification processing part is configured to calculate a relative value with respect to the reference index value of the identification index value for the different pixel from the reference pixel.

9. The solid object identifying apparatus according to claim 8, wherein the solid object identification processing part is configured to identify the object existing at the place corresponding to the different pixel based on the relative value, so as to conduct the solid object identification process.

10. The solid object identifying apparatus according to claim 1, further comprising:
   an identification process result storing part configured to store a previous result of the solid object identification process previously conducted by the solid object identification processing part, wherein
   the solid object identification processing part uses the identification index value and the previous result of the solid object identification process, which is stored in the identification process result storing part.

11. The solid object identifying apparatus according to claim 1, further comprising:
   a shape information storing part configured to store shape information indicating a shape acquired by capturing a predetermined specific object by the imaging part.

* * * * *